(12) United States Patent
Solheid et al.

(10) Patent No.: US 7,844,159 B2
(45) Date of Patent: Nov. 30, 2010

(54) TELECOMMUNICATIONS CONNECTION CABINET

(75) Inventors: James J. Solheid, Lakeville, MN (US); Daniel Ray Mertesdorf, Duluth, MN (US); Matthew J. Holmberg, Le Center, MN (US); Trevor D. Smith, Eden Prairie, MN (US); Joel B. Douglas, Hutchinson, MN (US); Kathleen M. Barnes, Golden Valley, MN (US); Marlon E. Holmquist, Gibbon, MN (US); Thomas C. Tinucci, Chaska, MN (US); Cindy S. Walters, Prior Lake, MN (US); James W. Conroy, Prior Lake, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 12/276,886

(22) Filed: Nov. 24, 2008

(65) Prior Publication Data

US 2009/0074372 A1 Mar. 19, 2009

Related U.S. Application Data

(63) Continuation of application No. 11/729,310, filed on Mar. 27, 2007, now Pat. No. 7,457,503, which is a continuation of application No. 10/613,764, filed on Jul. 2, 2003, now Pat. No. 7,233,731.

(51) Int. Cl.
G02B 6/00 (2006.01)
(52) U.S. Cl. .................................................. 385/135
(58) Field of Classification Search ................. 385/134, 385/135, 136, 53, 70, 137, 72, 75
See application file for complete search history.

(56) References Cited

U.S. PATENT DOCUMENTS

| 4,736,100 A | 4/1988 | Vastagh |
| 4,747,020 A | 5/1988 | Brickley et al. |
| 4,792,203 A | 12/1988 | Nelson et al. |
| 4,824,196 A | 4/1989 | Bylander |
| 4,861,134 A | 8/1989 | Alameel et al. |

(Continued)

FOREIGN PATENT DOCUMENTS

EP 0 743 701 A2 11/1996

(Continued)

OTHER PUBLICATIONS

Certified English translation of PCT publication No. WO 99/27404, which was published Jun. 3, 1999.

(Continued)

*Primary Examiner*—Javaid Nasri
(74) *Attorney, Agent, or Firm*—Merchant & Gould P.C.

(57) ABSTRACT

A telecommunications connection cabinet includes a termination region, a fiber optic splitter mounting location, and a predetermined connector storage region positioned within an interior of a housing. The termination region includes telecommunications adapters, each telecommunications adapter being configured for coupling together two fiber optic connectors such that an optical interconnection is made between the two fiber optic connectors. The connector storage region is spaced from the termination region. The storage region defines openings allotted to removably mount connector storage housings at the connector storage region.

23 Claims, 17 Drawing Sheets

U.S. PATENT DOCUMENTS

| | | |
|---|---|---|
| 4,900,123 A | 2/1990 | Barlow et al. |
| 4,948,220 A | 8/1990 | Violo et al. |
| 4,995,688 A | 2/1991 | Anton et al. |
| 5,023,646 A | 6/1991 | Ishida et al. |
| 5,058,983 A | 10/1991 | Corke et al. |
| 5,073,042 A | 12/1991 | Mulholland et al. |
| 5,076,688 A | 12/1991 | Bowen et al. |
| 5,142,598 A | 8/1992 | Tabone |
| 5,214,735 A | 5/1993 | Henneberger et al. |
| 5,233,674 A | 8/1993 | Vladic |
| 5,274,729 A | 12/1993 | King et al. |
| 5,274,731 A | 12/1993 | White |
| 5,317,663 A | 5/1994 | Beard et al. |
| 5,333,221 A | 7/1994 | Briggs et al. |
| 5,333,222 A | 7/1994 | Belenkiy et al. |
| 5,359,688 A | 10/1994 | Underwood |
| 5,363,465 A | 11/1994 | Korkowski et al. |
| 5,367,598 A | 11/1994 | Devenish, III et al. |
| 5,402,515 A | 3/1995 | Vidacovich et al. |
| 5,408,557 A | 4/1995 | Hsu |
| RE34,955 E | 5/1995 | Anton et al. |
| 5,420,958 A | 5/1995 | Henson et al. |
| 5,442,726 A | 8/1995 | Howard et al. |
| 5,448,015 A | 9/1995 | Jamet et al. |
| 5,469,526 A | 11/1995 | Rawlings |
| 5,497,444 A | 3/1996 | Wheeler |
| 5,506,922 A | 4/1996 | Grois et al. |
| 5,511,144 A | 4/1996 | Hawkins et al. |
| 5,542,015 A | 7/1996 | Hultermans |
| 5,647,043 A | 7/1997 | Anderson et al. |
| 5,708,751 A | 1/1998 | Mattei |
| 5,734,776 A | 3/1998 | Puetz |
| 5,764,844 A | 6/1998 | Mendes |
| 5,774,612 A | 6/1998 | Belenkiy et al. |
| 5,778,132 A | 7/1998 | Csipkes et al. |
| 5,784,515 A | 7/1998 | Tamaru et al. ............... 385/134 |
| 5,823,646 A | 10/1998 | Arizpe et al. |
| 5,825,955 A | 10/1998 | Ernst et al. |
| 5,883,995 A | 3/1999 | Lu |
| 5,909,526 A | 6/1999 | Roth et al. |
| 5,930,425 A | 7/1999 | Abel et al. |
| 5,945,633 A | 8/1999 | Ott et al. |
| 5,956,444 A | 9/1999 | Duda et al. |
| 5,969,294 A | 10/1999 | Eberle et al. |
| 5,975,769 A | 11/1999 | Larson et al. |
| 6,027,252 A | 2/2000 | Erdman et al. |
| 6,041,155 A | 3/2000 | Anderson et al. |
| 6,044,193 A | 3/2000 | Szentesi et al. |
| 6,061,492 A | 5/2000 | Strause et al. |
| 6,069,797 A | 5/2000 | Widmayer et al. |
| 6,076,975 A * | 6/2000 | Roth ........................... 385/76 |
| 6,079,881 A | 6/2000 | Roth |
| 6,096,797 A | 8/2000 | Prantl et al. |
| 6,149,315 A | 11/2000 | Stephenson |
| 6,160,946 A | 12/2000 | Thompson et al. |
| 6,188,687 B1 | 2/2001 | Mussman et al. |
| 6,188,825 B1 | 2/2001 | Bandy et al. |
| 6,208,796 B1 | 3/2001 | Williams Vigliaturo |
| 6,227,717 B1 | 5/2001 | Ott et al. |
| 6,234,683 B1 | 5/2001 | Waldron et al. |
| 6,236,795 B1 | 5/2001 | Rodgers |
| 6,240,229 B1 | 5/2001 | Roth |
| 6,247,849 B1 | 6/2001 | Liu |
| 6,256,443 B1 | 7/2001 | Uruno |
| 6,259,850 B1 | 7/2001 | Crosby, Jr. et al. |
| 6,271,484 B1 | 8/2001 | Tokutsu |
| 6,278,829 B1 | 8/2001 | BuAbbud et al. |
| RE37,489 E | 1/2002 | Anton et al. |
| 6,347,888 B1 | 2/2002 | Puetz |
| 6,356,697 B1 | 3/2002 | Braga et al. |
| 6,363,200 B1 | 3/2002 | Thompson et al. |
| 6,385,381 B1 | 5/2002 | Janus et al. |
| 6,411,767 B1 | 6/2002 | Burrous et al. |
| 6,418,262 B1 | 7/2002 | Puetz et al. |
| 6,424,781 B1 | 7/2002 | Puetz et al. |
| 6,425,694 B1 | 7/2002 | Szilagyi et al. |
| 6,431,762 B1 | 8/2002 | Taira et al. |
| 6,434,313 B1 | 8/2002 | Clapp, Jr. et al. |
| 6,452,925 B1 | 9/2002 | Sistanizadeh et al. |
| 6,453,033 B1 | 9/2002 | Little et al. |
| 6,464,402 B1 | 10/2002 | Andrews et al. |
| D466,087 S | 11/2002 | Cuny et al. |
| 6,480,487 B1 | 11/2002 | Wegleirner et al. |
| 6,483,977 B2 | 11/2002 | Battey et al. |
| 6,496,640 B1 | 12/2002 | Harvey et al. |
| 6,539,147 B1 | 3/2003 | Mahony |
| 6,539,160 B2 | 3/2003 | Battey et al. |
| 6,542,688 B1 | 4/2003 | Battey et al. |
| 6,554,485 B1 | 4/2003 | Beatty et al. |
| 6,556,763 B1 | 4/2003 | Puetz et al. |
| 6,577,595 B1 | 6/2003 | Counterman |
| 6,597,670 B1 | 7/2003 | Tweedy et al. |
| 6,614,980 B1 | 9/2003 | Mahony |
| 6,621,975 B2 | 9/2003 | Laporte et al. |
| 6,623,170 B2 | 9/2003 | Petrillo |
| 6,625,375 B1 | 9/2003 | Mahony |
| 6,631,237 B2 | 10/2003 | Knudsen et al. |
| 6,654,536 B2 | 11/2003 | Battey et al. |
| 6,661,961 B1 | 12/2003 | Allen et al. |
| 6,668,127 B1 | 12/2003 | Mahony |
| 6,678,457 B2 | 1/2004 | Kim et al. |
| 6,755,574 B2 | 6/2004 | Fujiwara |
| 6,760,530 B1 | 7/2004 | Mandry |
| 6,760,531 B1 | 7/2004 | Solheid et al. |
| 6,768,860 B2 | 7/2004 | Liberty |
| 6,778,752 B2 | 8/2004 | Laporte et al. |
| 6,788,786 B1 | 9/2004 | Kessler et al. |
| 6,792,190 B2 | 9/2004 | Xin |
| 6,792,191 B1 | 9/2004 | Clapp, Jr. et al. |
| 6,815,612 B2 | 11/2004 | Bloodworth et al. |
| 6,850,685 B2 | 2/2005 | Tinucci et al. |
| 6,853,795 B2 | 2/2005 | Dagley et al. |
| 6,870,734 B2 | 3/2005 | Mertesdorf et al. |
| 6,901,200 B2 | 5/2005 | Schray |
| 6,909,833 B2 | 6/2005 | Henschel et al. |
| 6,920,274 B2 | 7/2005 | Rapp et al. |
| 6,925,241 B2 | 8/2005 | Bohle et al. |
| 6,950,593 B2 | 9/2005 | Hodge et al. |
| 6,980,725 B1 * | 12/2005 | Swieconek ................. 385/135 |
| 6,983,095 B2 | 1/2006 | Reagan et al. |
| 7,029,322 B2 | 4/2006 | Ernst et al. |
| 7,142,764 B2 | 11/2006 | Allen et al. |
| 7,198,409 B2 | 4/2007 | Smith et al. |
| 7,200,317 B2 | 4/2007 | Reagan et al. |
| 7,218,827 B2 | 5/2007 | Vongseng et al. |
| 7,233,731 B2 | 6/2007 | Solheid et al. |
| 7,277,620 B2 | 10/2007 | Vongseng et al. |
| 7,407,330 B2 | 8/2008 | Smith et al. |
| 7,457,503 B2 | 11/2008 | Solheid et al. |
| 2001/0001270 A1 | 5/2001 | Williams Vigliaturo |
| 2002/0034290 A1 | 3/2002 | Pershan |
| 2002/0176681 A1 | 11/2002 | Puetz et al. |
| 2002/0181893 A1 | 12/2002 | White et al. |
| 2003/0002812 A1 * | 1/2003 | Lampert ....................... 385/78 |
| 2003/0113086 A1 | 6/2003 | Jun et al. |
| 2003/0174996 A1 | 9/2003 | Henschel et al. |
| 2003/0207601 A1 | 11/2003 | Adachi |
| 2004/0074852 A1 | 4/2004 | Knudsen et al. |
| 2004/0126069 A1 | 7/2004 | Jong et al. |
| 2004/0165852 A1 | 8/2004 | Erwin et al. |
| 2004/0228598 A1 | 11/2004 | Allen et al. |
| 2004/0264873 A1 | 12/2004 | Smith et al. |
| 2005/0002633 A1 | 1/2005 | Solheid et al. |
| 2005/0129379 A1 | 6/2005 | Reagan et al. |

| | | | |
|---|---|---|---|
| 2005/0163448 | A1 | 7/2005 | Blackwell, Jr. et al. |
| 2006/0083475 | A1 | 4/2006 | Grubish et al. |
| 2006/0115220 | A1 | 6/2006 | Elkins, II et al. |
| 2006/0204200 | A1 | 9/2006 | Lampert et al. |
| 2009/0087157 | A1 | 4/2009 | Smith et al. |

FOREIGN PATENT DOCUMENTS

| | | |
|---|---|---|
| EP | 0 788 002 | 8/1997 |
| EP | 0 871 047 | 10/1998 |
| EP | 0 975 180 | 1/2000 |
| EP | 1 045 267 | 10/2000 |
| JP | 63-229409 | 9/1988 |
| JP | 2000075180 | 3/2000 |
| JP | 2001027720 | 1/2001 |
| JP | 2001235633 | 8/2001 |
| JP | 1144266 S | 6/2002 |
| JP | 3307618 B2 | 7/2002 |
| JP | 2005091379 | 4/2005 |
| JP | 3761762 B2 | 3/2006 |
| WO | WO 98/53347 | 11/1998 |
| WO | 99/27404 | 6/1999 |
| WO | WO 00/75706 A2 | 12/2000 |
| WO | WO 02/21182 A1 | 3/2002 |
| WO | WO 02/103429 A2 | 12/2002 |
| WO | WO 2004/032532 A2 | 4/2004 |

OTHER PUBLICATIONS

First Amended Complaint relating to *ADC Telecommunications, Inc. v. Tyco Electronics Corp.*, Civil Action No. 08-CV-05222, filed Dec. 8, 2008.

Answer, Affirmative Defenses, and Counter Claims to the First Amended Complaint relating to *ADC Telecommunications, Inc. v. Tyco Electronics Corp.*, Civil Action No. 08-CV-05222, filed Mar. 13, 2009.

ADC's Reply to Counterclaims and Counterclaims relating to *ADC Telecommunications, Inc. v. Tyco Electronics Corp.*, Civil Action No. 08-CV-05222, filed Apr. 2, 2009.

Drawings showing an ADC fiber storage trough concept including presentation entitled "Fujitsu Fiber Management Project Fiber Trough Concept", 11 pages (Jun. 2002).

Drawings showing another ADC fiber storage trough concept including presentation entitled "Fujitsu Fiber Management Project Fiber Trough Concept" by Kathy Barnes (7 pages), photos of trough disclosed in presentation by Kathy Barnes installed in a rack (3 pages) and presentation entitled "Fujitsu Fiber Management Project Fiber Trough Concept" by Dan Mertesdorf (9 pages), 19 total pages (Apr. 2002).

"Retainer Staright [sic] Removable SC," which shows a latch design, 2 pages (Jan. 17, 2006).

Brochure from Amphenol Corp. entitled "Amphenol® 954 Series one piece SC Connector," 2 pgs. (1990).

AMP Inc. catalog entitled "Fiber Optic Products," front and back covers and p. 59, (4 pgs.) (© 1991).

HRScatalog entitled "Optical Fibre Connectors," front and back covers and pp. 16, 17 and 49 (5 pages) (Mar. 1991).

AT&T Network Systems catalog entitled "Fiber Optic Products Innovation for wide ranging applications," front and back covers and pp. 6-1 through 6-16 (18 pages) (© 1995).

ADC Telecommunications, Inc.'s Outside Plant, Fiber Cross-Connect Solutions Products Brochure; front cover, Table of Contents, pp. 1-48, and back cover.; revised Jun. 2002, Item No. 1047.

ADC Telecommunications, Inc.'s 6th Edition of Next Generation Frame (NGF) Product Family Ordering Guide; front cover, Table of Contents, pp. 1-41, and back cover; revised Feb. 2003, Item No. 820.

ADC Telecommunications, Inc.'s Fiber Optic, Cable Assemblies and Accessories Brochure; front cover, Table of Contents, pp. 1-23, and back cover; revised Apr. 2003, Item No. 100300.

ADC Telecommunications, Inc.'s OMX™ 600, Optical Distribution Frame Brochure; front cover, Table of Contents, pp. 1-14, and back cover; revised Feb. 2001, Item No. 854.

Iwano, S. et al., "MU-type Optical Fiber Connector System," *NTT Review*, vol. 9, No. 2, pp. 63-71 (Mar. 1997).

NTT Int'l Fiber Termination Module (FTM) & Premises Optical Distribution Cabinets (PODC) product brochure, 3 pages, undated.

Sugita, E. et al., "SC-Type Single-Mode Optical Fiber Connectors," *Journal of Lightwave Technology*, vol. 7, No. 11, pp. 1689-1696 (Nov. 1989).

24 photos of LambdaUnite® Blank Card; "LambdaUnite® MultiService Switch (MSS)" brochure (2003); and "Lucent's LambdaUnite® Busts Out" official release (Jan. 29, 2002).

U.S. Appl. No. 11/729,425, filed Mar. 27, 2007 including Fourth Preliminary Amendment filed May 2, 2008.

Complaint relating to Civil Action No. 08-CV-5222-RMK-JJK, filed Sep. 19, 2008 (8 pages).

Complaint relating to Civil Action No. 08-CV-02234-DWF-JSM, filed Jun. 13, 2008.

FONS Corporation's MDC Series Rack or Wall Mount Enclosures product sheet, 3 pages, (2002).

FONS Corporation's Modular Distribution Cabinets Rack Mount Enclosures, Model MDC-7, product sheet, 2 pages (2005) (shows the same device as shown in Exhibit A).

FONS Corporation's Technical Drawing No. 11669, Rev. D, of Distribution Cabinet Assembly MFDC-7, 1 page (technical drawing depicting the device shown in Exhibit B).

ADC Telecommunications, Inc.'s Secure Fiber Entrance Terminal (SFET) Brochure; front cover, pp. 2-7, and back cover; revised May 1998, Item No. 1005.

ADC Telecommunications, Inc.'s $2^{nd}$ Edition of Fiber Panel Products; front cover, Table of Contents, pp. 1-111, and back cover; revised Jul. 1996, Item No. 846.

First Amended Complaint, *ADC Telecommunication, Inc. and Fiber Optic Network Solutions Corp. v. AFL Telecommunications LLC*, Civil Action No. 0:08-cv-02234-DWF-JSM, 8 pages (Aug. 14, 2008).

Defendant's Answer and Defenses in Response to the First Amended Complaint, *ADC Telecommunication, Inc. and Fiber Optic Network Solutions Corp. v. AFL Telecommunications LLC*, Civil Action No. 0:08-cv-02234-DWF-JSM, 14 pages (Dec. 8, 2008).

Amended Order for Pretrial Conference, *ADC Telecommunication, Inc. and Fiber Optic Network Solutions Corp. v. AFL Telecommunications LLC*, Civil Action No. 0:08-cv-02234-DWF-JSM, 5 pages (Dec. 11, 2008).

*Response to prior art statement* submitted by ADC Telecommunications, Inc. in Civil Action No. 08-CV-02234-DWF-JSM on Aug. 18, 2009 (131 pages).

Nexans, Cross-Connect Cabinet III: Plastic Watertight Cabinet for FTTH Applications, dated 2002 (2 pages).

Nexans, Cross-Connect Cabinet V: Metallic Watertight Cabinet for FTTH Applications, dated 2002 (2 pages).

*Prior art statement* submitted by AFL Telecommunications LLC in Civil Action No. 08-CV-02234-DWF-JSM on May 11, 2009 (145 pages).

*Supplemental prior art statement* submitted by AFL Telecommunications LLC in Civil Action No. 08-CV-02234-DWF-JSM on May 19, 2009 (155 pages).

Optical fiber coupler review. Technical Report 2001, showing Sumitomo Osaka Cement Co. Ltd 's Optical Coupler (pp. 41-42).

Hasegawa et al., *100GHz-48CH Athermal AWG with a Novel Temperature Insensitive Principle*, National Fiber Optics Engineers Conference, 2003 Technical Proceedings, pp. 801-808.

ATI Optique Catalog, ATI Optique Division of TI eletronique, Version 2.6, released Mar. 27, 2002 (50 pages).

Tachikura et al., *Newly Developed Optical Fiber Distribution System and Cable Management in Central Office*, International Wire & Cable Symposium, Proceedings of the $50^{th}$ IWCS, pp. 98-105.

*Couplers: Couplers WDMS Packaging*, Alcoa Fujikura Ltd., Telecommunications Division, © 2000 (5 pages) showing AFL splitters.

20 photographs showing what AFL Telecommunications LLC purports to be the ECOE cabinet referenced in the Prior art statement and the Supplemental prior art statement listed above. AFL Telecommunications LLC asserts the cabinet shown in the photographs was on sale as early as 2001.

*Second supplemental prior art statement* submitted by AFL Telecommunications LLC in Civil Action No. 08-CV-02234-DWF-JSM on Nov. 10, 2009 (8 pages).

Office Action cited by Japanese Patent Examiner in Japanese application No. 2006-517505, which claims priority to U.S. Appl. No. 10/613,764, to which the present application claims priority.

*Prior art statement* submitted by AFL Telecommunications LLC in Civil Action No. 08-CV-02234-DWF-JSM on May 11, 2009 (145 pages).

*Supplemental prior art statement submitted* by AFL Telecommunications LLC in Civil Action No. 08-CV-02234-DWF-JSM on May 19, 2009 (155 pages).

Certified translation of Office Action (5 pages) cited by Japanese Patent Examiner in Japanese application No. 2006-517505, which is equivalent to copending and coassigned U.S. Appl. No. 12/276,886, filed Nov. 24, 2008, by Smith et al., titled "Telecommunications Connection Cabinet." (The Japanese language Office Action was submitted with the IDS mailed Dec. 1, 2009.).

Notice of Allowance mailed May 6, 2010 in copending U.S. Appl. No. 12/185,504, now published as U.S. Publication No. 2009/0087157.

European Search Report mailed Nov. 19, 2009 for European Application No. 09011819, which claims priority to previously cited U.S. Patent No. 7,198,409 (7 pages).

Stipulated Dismissal of all Claims and Counterclaims relating to *ADC Telecommunications, Inc.* v. *Tyco Electronics Corp.*, Civil Action No. 08-CV-05222, filed Oct. 30, 2009, 2 pages.

Second supplemental prior art statement submitted by AFL Telecommunications LLC in Civil Action No. 08-CV-02234-DWF-JSM on Nov. 10, 2009 (8 pages).

Joint Claim Construction Statement, relating to *ADC Telecommunications, Inc.* v, *AFL Telecommunications LLC*, Civil Action No. 08-CV-02234, filed Nov. 17, 2009 (40 pages).

Plaintiff ADC's Markman Brief (Redacted Version), filed Feb. 9, 2010, relating to *ADC Telecommunications, Inc.* v, *AFL Telecommunications LLC*, Civil Action No. 08-CV-02234-DWF-JSM (99 pages).

Defendant AFL Telecommunications LLC's Memorandum in Support of Proposed Claim Construction, (AFL's Markman Brief), filed Feb. 9, 2010, relating to *ADC Telecommunications, Inc.* v, *AFL Telecommunications LLC*, Civil Action No. 08-CV-02234 (42 pages).

Plaintiff ADC's Responsive Markman Brief, filed Mar. 9, 2010, relating to *ADC Telecommunications, Inc.* v, *AFL Telecommunications LLC*, Civil Action No. 08-CV-02234 (21 pages).

Defendant AFL Telecommunications LLC's Answering Claim Construction Brief, filed Mar. 9, 2010, relating to *ADC Telecommunications, Inc.* v, *AFL Telecommunications LLC*, Civil Action No. 08-CV-02234 (60).

Stipulated Dismissal of all Claims and Counterclaims relating to *ADC Telecommunications, Inc.* v. *AFL Telecommunications LLC*, Civil Action No. 08-CV-02234, filed Jul. 27, 2010 (2 pages).

Dismissal Order relating to *ADC Telecommunications, Inc.* v, *AFL Telecommunications LLC*, Civil Action No. 08-CV-02234, filed Jul. 28, 2010 (1 pages).

\* cited by examiner

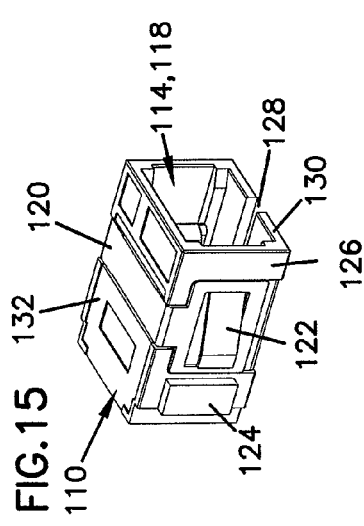
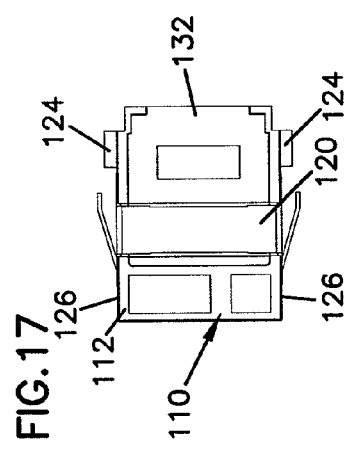
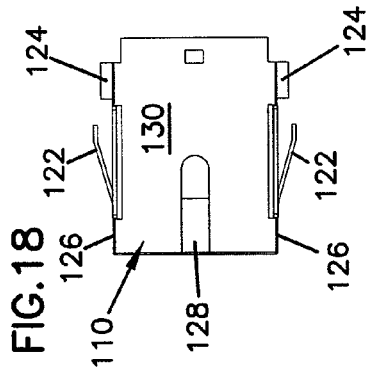
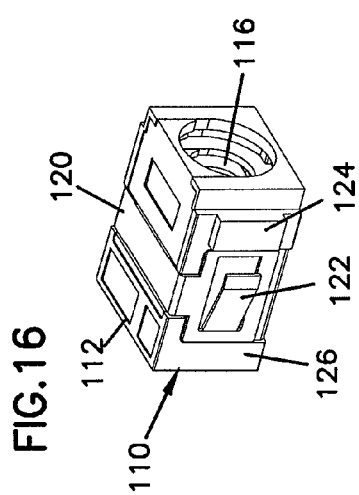
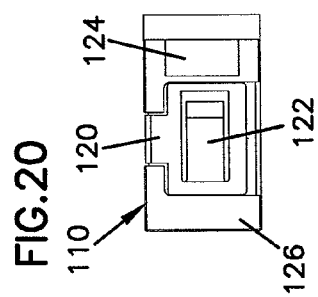
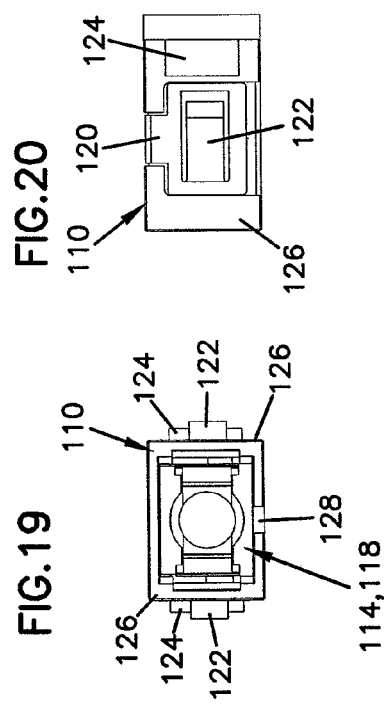
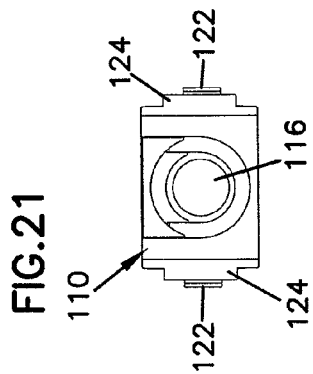

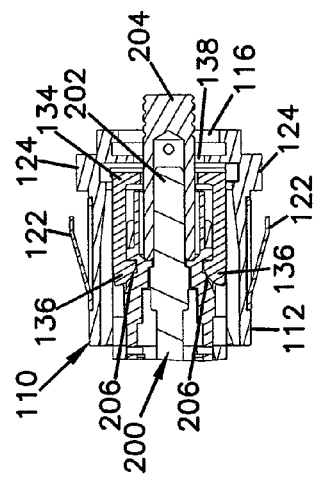
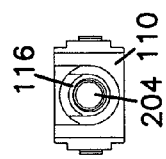
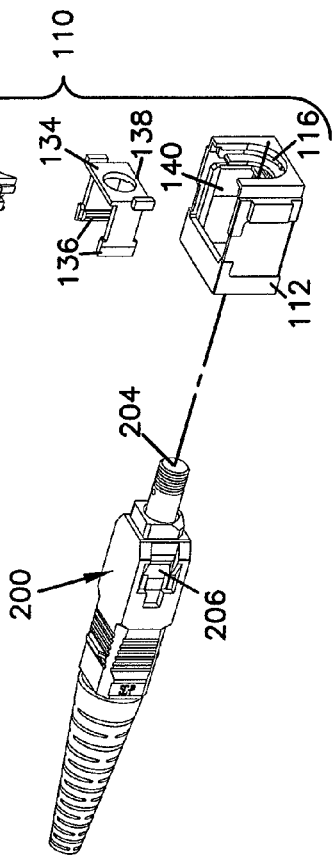
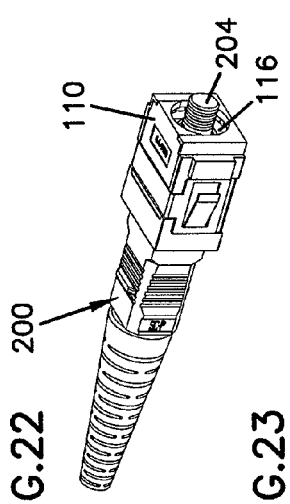
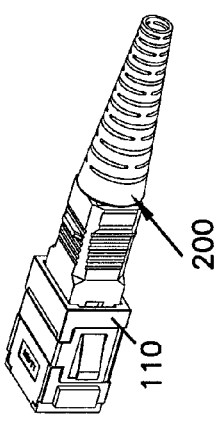
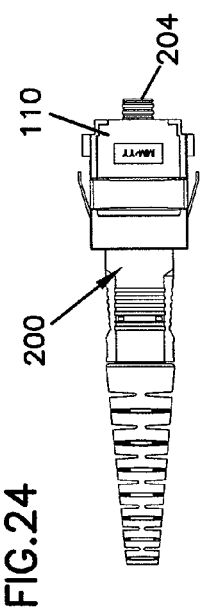
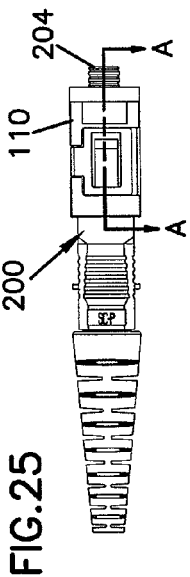

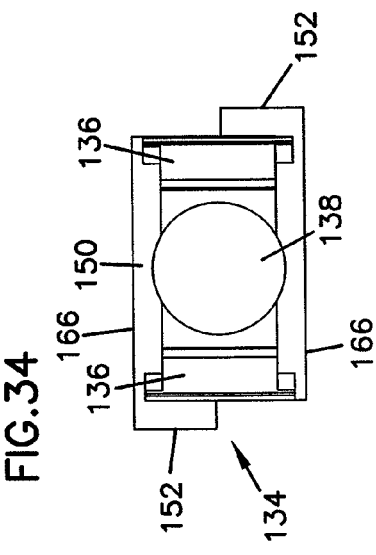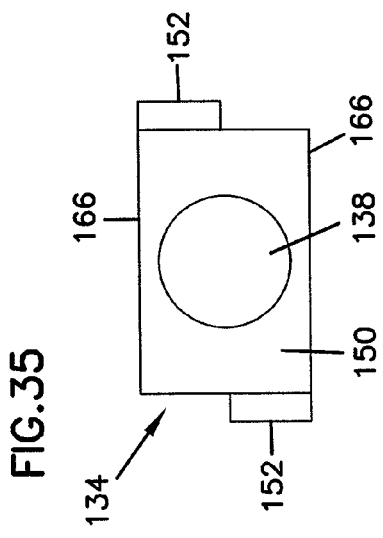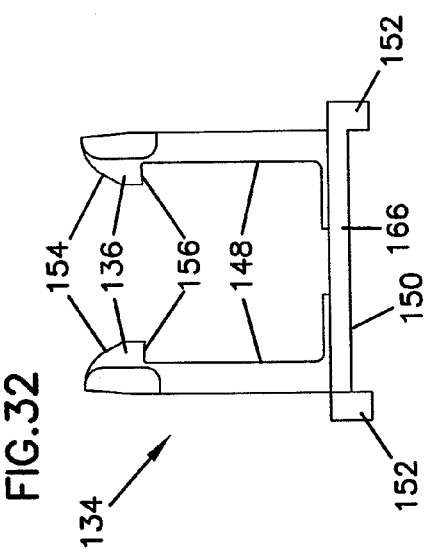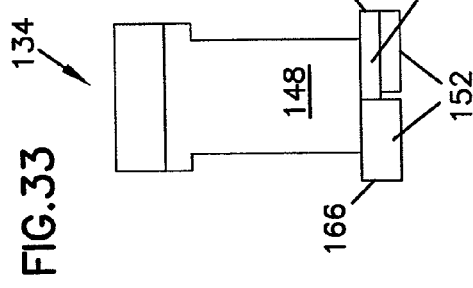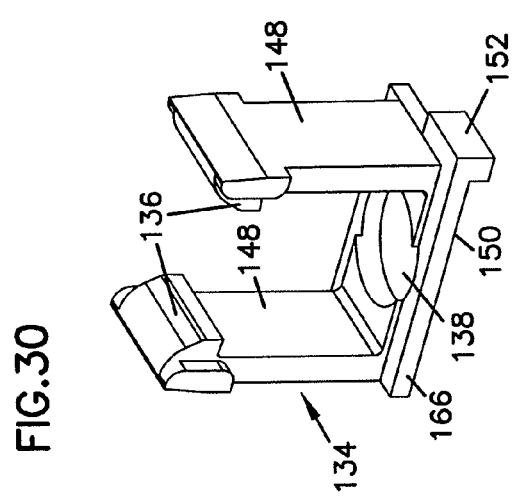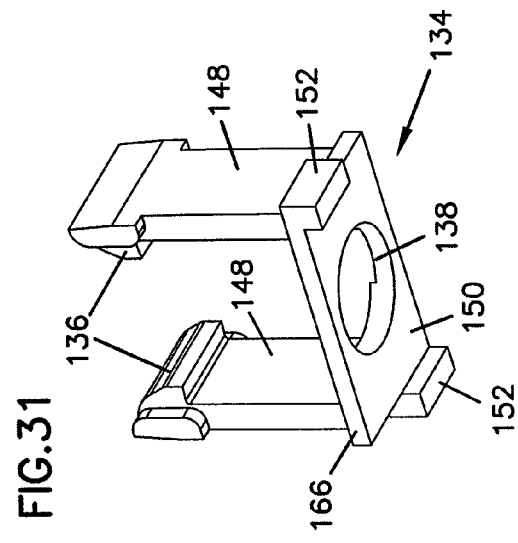

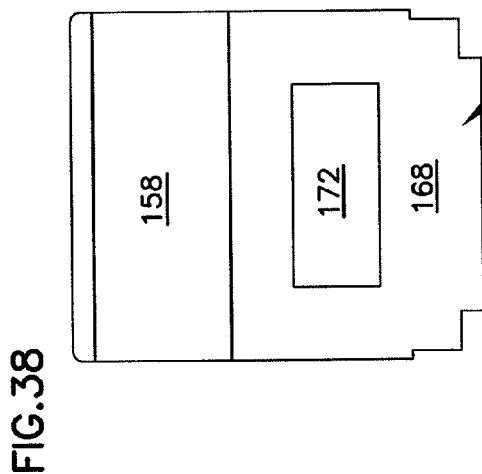
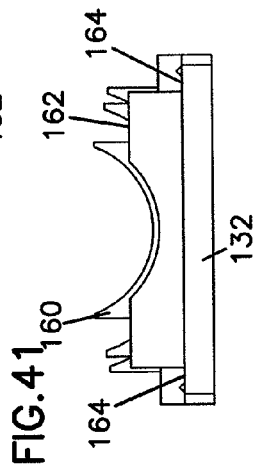
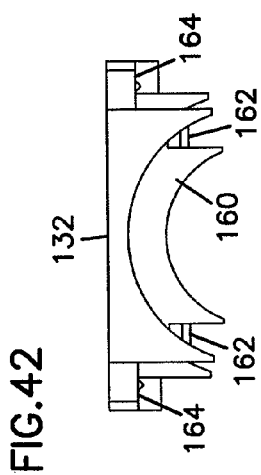
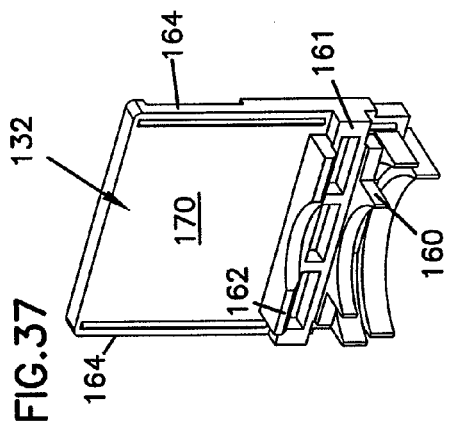
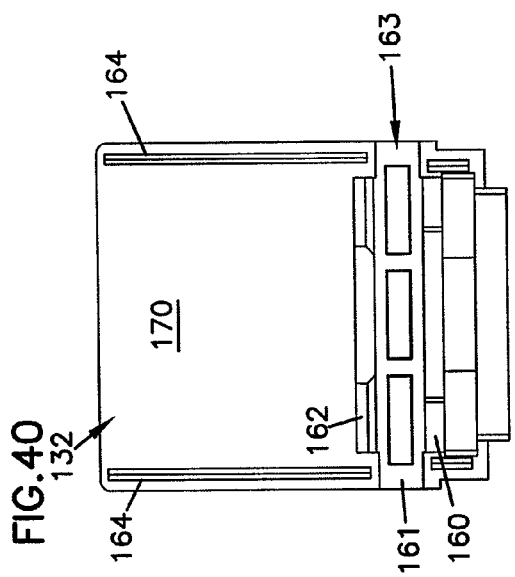
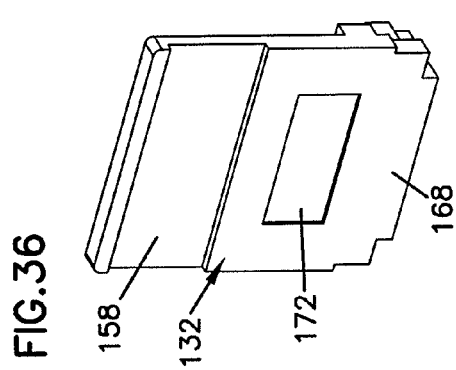
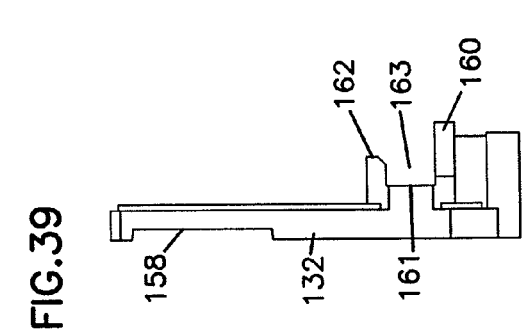

TELECOMMUNICATIONS CONNECTION CABINET

CROSS REFERENCE TO RELATED APPLICATIONS

This application is a continuation of application Ser. No. 11/729,310, filed Mar. 27, 2007, now U.S. Pat. No. 7,457,503, which is a continuation of application Ser. No. 10/613,764, filed Jul. 2, 2003, now U.S. Pat. No. 7,233,731, which applications are incorporated herein by reference.

TECHNICAL FIELD

The present invention generally relates to cabinets for connecting telecommunications cables.

BACKGROUND

Installation of telecommunications equipment to support the current and potential future needs of a particular group of customers may make it desirable to install more capacity than the current customer base alone may dictate. Excess capacity may be installed to permit the easy addition of new circuits for new or existing customers. A telecommunications connection cabinet with such excess capacity may be pre-configured at a fabrication facility and installed in the field to include more circuits than are necessary to provide service to the existing customers. Prior to the linkage of these surplus or future expansion circuits to customers, it is desirable to provide for storage, organization and protection of the patch cords or other connection cables within the cabinet.

Such connection cables might include fiber optic patch cords terminated with fiber optic connectors. Fiber optic connectors include a polished end face, typically held by a ferrule, which permits positioning of the optical fiber held by the connector to receive and transmit signals another optical fiber or optical light source. It is desirable to keep these polished end faces as free of contaminants as possible to improve the transmission of light to and from the optical fiber held by the connector. Such contaminants which might adversely impact the transmission of light to and from the optical fiber include but are not limited to dust and finger prints.

Dust caps may be provided for connectors to protect the polished end face of the optical fiber. However, when such dust caps are in place, the connector is not capable of being received in known optical fiber adapters, such as those described in U.S. Pat. Nos. 5,317,663, and 6,347,888. The disclosures of these patents are incorporated herein by reference. A connector may be inserted into one of these known adapters for storage or pre-wiring of a cross-connection point, an interconnection point or some other type telecommunications switching or connection equipment with the dust cap removed. While the adapters might provide some protection from contaminants to a single connector inserted into an adapter, these adapters are not as effective as a dust cap in protecting the polished end face.

It is desirable to improve the known methods and apparatus for protecting the polished end face of a fiber optic connector within telecommunications equipment.

SUMMARY

A telecommunications cabinet comprising a top, a floor, a pair of opposing sides, a front wall and a rear wall defining an interior, the front including an access door for accessing the interior. Within the interior are mounted a cable management structure, an adapter panel with an adapter configured to optically connect two optical fiber cables terminated with fiber optic connectors, and a fiber optic connector holder mounted in openings of the adapter panel. The connector holder has an opening configured to receive a fiber optic connector with a dust cap, the opening accessible from a front side of the adapter panel. A fiber optic connector including a ferrule with a polished end face holding an end of an optical fiber with a dust cap placed about the ferrule and polished end face is inserted within the opening of a fiber optic connector holder.

A telecommunications connection rack with a rack mounting structure, and a cable management structure, a fanout panel and an adapter panel mounted to the rack mounting structure. The adapter panel includes a plurality of adapter openings sized to receive and mount fiber optic adapters for optically connecting optical fibers within fiber optic cables terminated with fiber optic connectors, and a plurality of optical fiber adapters mounted within the openings. A cable connector holder panel is mounted to the rack mounting structure and includes a plurality of openings sized similarly to the openings in the adapter panel and a plurality of fiber optic connector holders mounted within the openings. Each of the fiber optic connector holders is configured to receive a fiber optic connector with a dust cap in place about a polished end face of a ferrule holding the end of an optical fiber. The cable management structure is configured to direct a fiber optic cable from the fanout panel to each of the adapter panel and the cable connector holder panel and to store excess cable length.

A method of connecting telecommunications service cables including providing a equipment mounting rack with a fanout module, an adapter module, a connector holder module and a cable management structure mounted to the rack. A multi-strand optical fiber service cable is directed to the fanout module. The multiple strands of the service cable are separated into individual fiber patch cords extending from the fanout module, with a distal end of each patch cord terminated with a fiber optic connector. The fiber optic connectors include a dust cap positioned about a polished end face. A first patch cord is extended from the fanout module into the cable management structure so that the connector of the first patch cord is proximate a fiber optic connector holder mounted within an opening in a front of the connector holder module. The fiber optic connector of the first patch cord is inserted into the fiber optic connector holder without removing the dust cap. The connector of the first patch cord is withdrawn from the connector holder. The dust cap is removed from the polished end face. The first patch cord is adjusted within the cable management structure so that the connector is adjacent an fiber optic adapter mounted within an opening in a front of the adapter module. The connector of the first patch cord is inserted into the adapter so that the optical fiber of the patch cord is optically connected to a second connector inserted within an opposite end of the adapter.

BRIEF DESCRIPTION OF THE DRAWINGS

The accompanying drawings, which are incorporated in and constitute a part of the description, illustrate several aspects of the invention and together with the detailed description, serve to explain the principles of the invention. A brief description of the drawings is as follows:

FIG. 15 is a first perspective view of a fiber optic connector holder according to the present invention.

FIG. 16 is a second perspective view of the fiber optic connector holder of FIG. 15.

FIG. 17 is a top view of the fiber optic connector holder of FIG. 15.

FIG. 18 is a bottom view of the fiber optic connector holder of FIG. 15.

FIG. 19 is a first end view of the fiber optic connector holder of FIG. 15.

FIG. 20 is a side view of the fiber optic connector holder of FIG. 15.

FIG. 21 is a second opposite end view of the fiber optic connector holder of FIG. 15.

FIG. 22 is a first perspective view of system for holder a fiber optic connector including the fiber optic connector holder of FIG. 15 with a fiber optic connector inserted.

FIG. 23 is a second perspective view of the system for holding a fiber optic connector of FIG. 22.

FIG. 24 is a top view of the system for holding a fiber optic connector of FIG. 22.

FIG. 25 is a side view of the system for holding a fiber optic connector of FIG. 22.

FIG. 26 is an end view of the system for holding a fiber optic connector of FIG. 22.

FIG. 27 is a cross-sectional view of the system for holding a fiber optic connector of FIG. 8, taken along line A-A in FIG. 25.

FIG. 28 is an exploded perspective view of the system for holding a fiber optic connector of FIG. 22.

FIG. 30 is a first perspective view of an inner housing of the fiber optic connector holder of FIG. 15.

FIG. 31 is a second perspective view of the inner housing of FIG. 30.

FIG. 32 is a top view of the inner housing of FIG. 30.

FIG. 33 is a side view of the inner housing of FIG. 30.

FIG. 34 is a first end view of the inner housing of FIG. 30.

FIG. 35 is a second end view of the inner housing of FIG. 30.

FIG. 36 is a first perspective view of the cover of the fiber optic connector holder of FIG. 15.

FIG. 37 is a second perspective view of the cover of FIG. 36.

FIG. 38 is a top view of the cover of FIG. 36.

FIG. 39 is a side view of the cover of FIG. 36.

FIG. 40 is a bottom view of the cover of FIG. 36.

FIG. 41 is a first end view of the cover of FIG. 36.

FIG. 42 is a second end view of the cover of FIG. 36.

DETAILED DESCRIPTION

Reference will now be made in detail to exemplary aspects of the present invention which are illustrated in the accompanying drawings. Wherever possible, the same reference numbers will be used throughout the drawings to refer to the same or similar parts.

Figure 1:
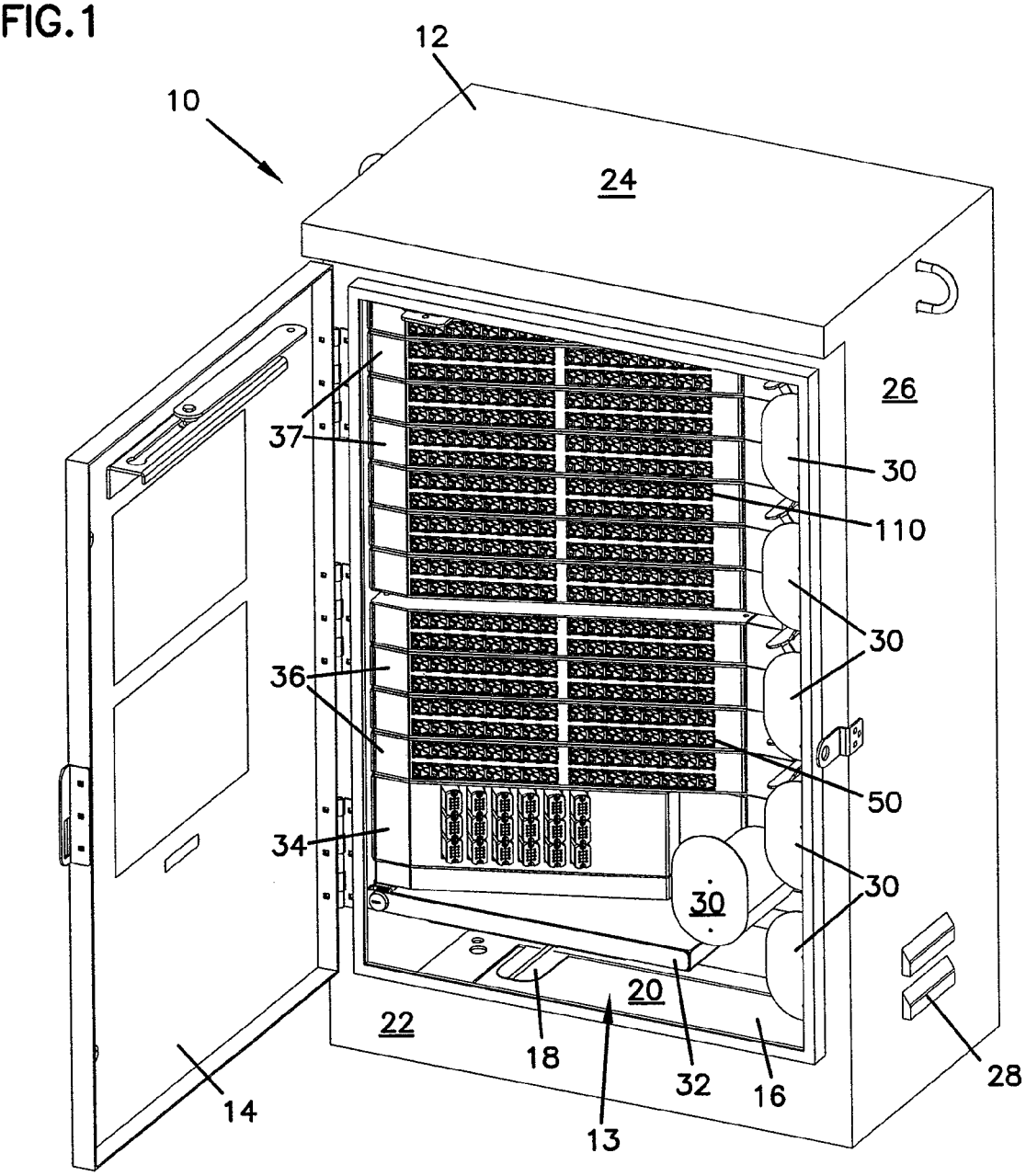
FIG. 1 is front perspective view of a telecommunications connection cabinet according to the present invention with an access door to the front of the cabinet open.

Telecommunications connection cabinets, such as cabinet 10 shown in FIG. 1, are used to permit organization and interconnection of different telecommunications infrastructure cables. A multi-strand telecommunications service cable such as an IFC or ribbon cable with multiple optical fibers, may be used to electronically or optically link widely spaced facilities. The service cable may be directed into cabinet 10 where it may be connected to a fanout module 34 and separated into individual fibers. Each of these strands may be connected to a patch cord 46 which may be terminated with a fiber optic connector. The fiber optic connector of patch cord 46 (such as connector 200 described below) may then be inserted into the front of an adapter 50 mounted to an adapter module 36 within cabinet 10.

Figure 53:
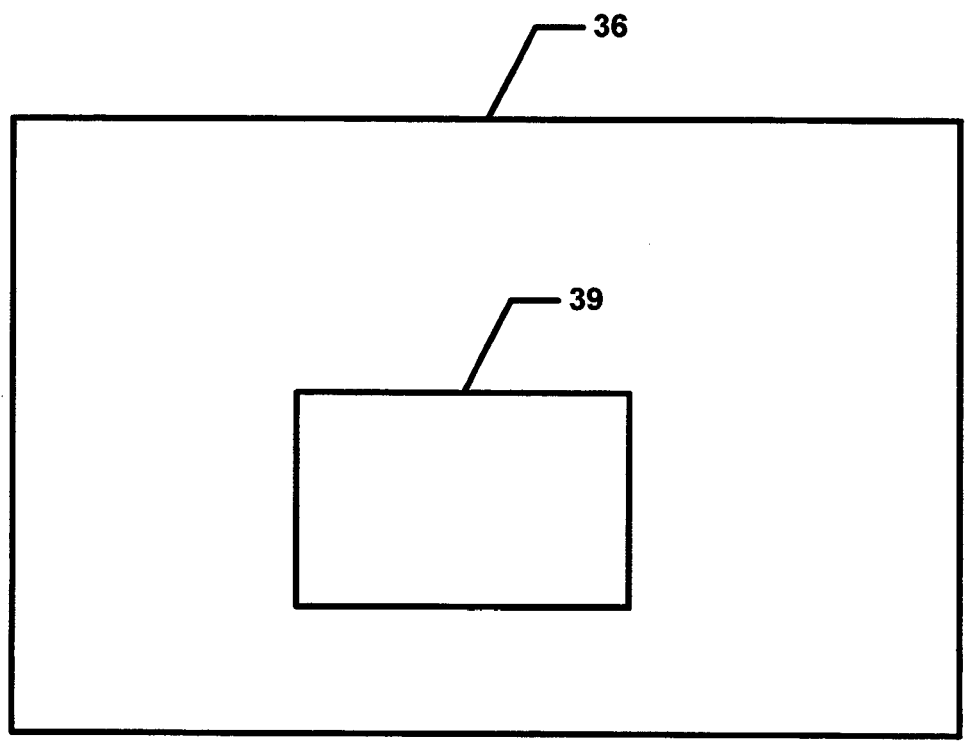
FIG. 53 is a block schematic diagram showing a splitter arranged within an adapter module in accordance with the principles of the present disclosure.

Adapter module 36 may also include a splitter 39 (see FIG. 53) that combines the signals from up to 32 individual patch cords 46 into a single optical fiber cable. As shown in the FIGS., there are four adapter modules 36 with splitters 39. As configured, cabinet 10 may have up to four optical fibers carrying the signals from up to 128 patch cords 46. These up to four optical fiber cables are directed to a splice module 32 mounted within cabinet 10. These up to four cables are available to splice in splice drawer 32 for communication of the signals to other downstream telecommunication equipment.

For patch cords 48 connected to circuits for which connection to downstream telecommunications equipment is anticipated but not yet required, these patch cords are routed instead to a connector holder module 37. Connectors 200 terminating patch cords 48 are directed into a connector holder 110. These patch cords 48 are not optically linked to any downstream equipment and are being stored and protected for damage or contamination in connector holders 110 until needed.

Figure 2:
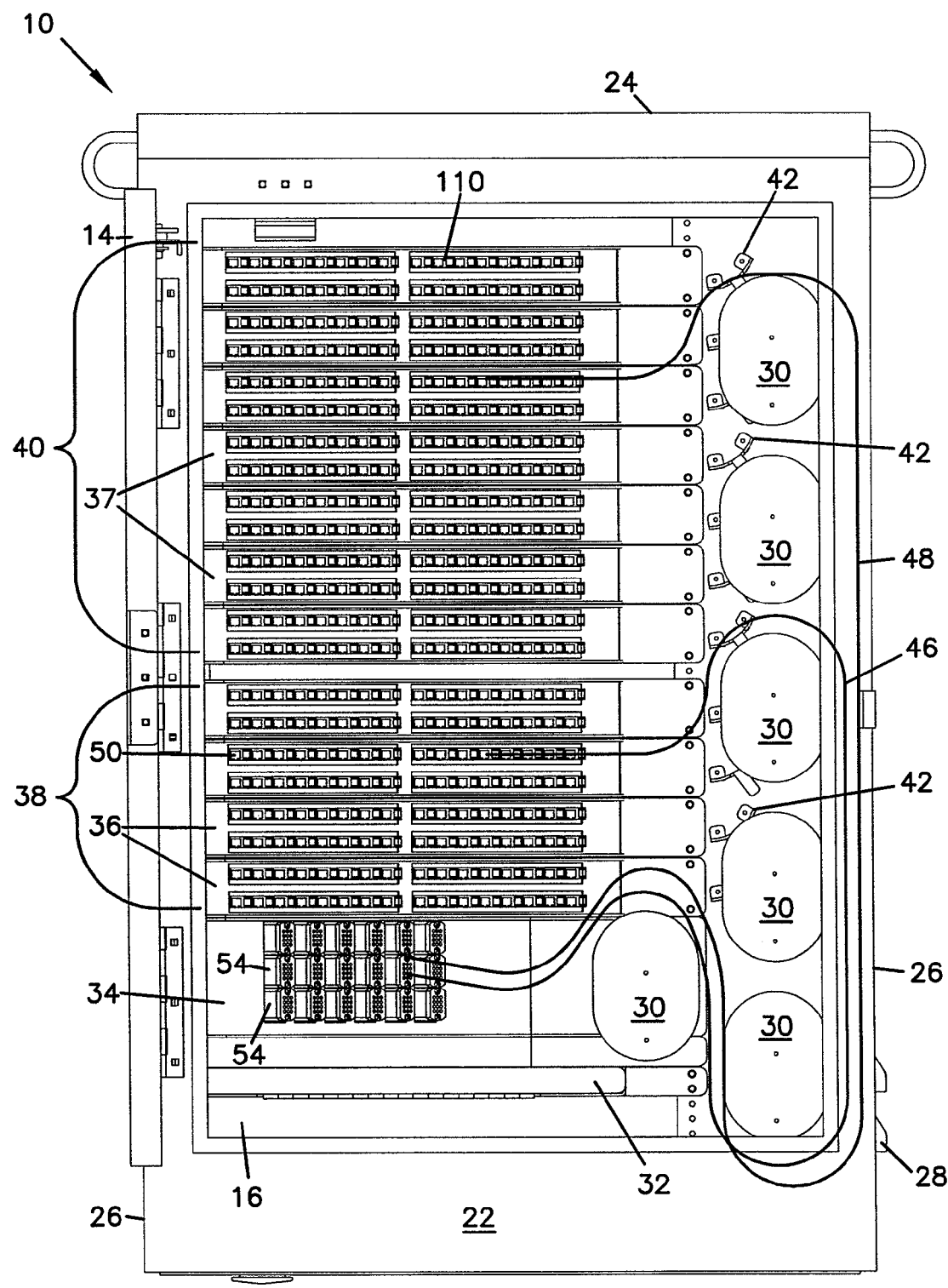
FIG. 2 is front view of the telecommunications connection cabinet of FIG. 1 with illustrative cable paths.

Referring now to FIGS. 1 and 2, cabinet 10 includes a housing 12 with a top 24, opposing sides 26, a front wall 22 and a floor 20. A rear wall 23, shown in FIG. 4 below, cooperates with the top, sides, front and floor to enclose the equipment mounted within housing 12 in an interior 13. Sides 26 include vent openings 28 which are shielded to prevent rain, snow and debris entry into interior 13. Front wall 22 includes a front access opening 16 permitting access to the front of the equipment mounted within interior 13. A door 14 is hinged to one side of opening 16 and closes off opening 16 to seal interior 13 from the elements when closed. A cable entry 18 in floor 20 allows the multi-strand telecommunications service cables to be fed into interior 13 and customer cables from the splice tray to exit interior 13. While only one opening 18 is shown in FIG. 1, additional openings in floor 20 may be provided depending on the size and number of cables entering and exiting cabinet 10.

Mounted within interior 13 is a variety of telecommunications equipment and supporting structure. As will be described below, interior 13 includes a rack mounting structure to which this telecommunications equipment is mounted. The equipment within interior 13 includes splice module 32, fanout module 24, a plurality of adapter modules 36, and a plurality of connector holder modules 37. Adjacent this equipment are mounted a plurality of cable storage spools 30 and bend radius protectors 42. Spools 30 and radius protectors 42 cooperate to direct cables between the fronts of the different telecommunications equipment mounted within interior 13.

Within interior 13, adapter modules 36 and connector holder modules 37 include a module housing, which will be discussed below. Each of the housings for modules 36 and 37 are mounted within the internal rack mounting structure of cabinet 10. Adapter modules 36 are grouped together in an active connection stack 38 and connector holder modules 37 are grouped together in a storage stack 40. Fanout module 34 is mounted beneath active connection stack 38 as the service cable enters cabinet 10 from below through opening 18. As configured in the drawings, cabinet 10 also directs the customer cables through floors 20, so splice module 32 is located below the active connection and storage areas. If the service and/or customer cables enter cabinet 10 through an opening through or adjacent to top 24, fanout module 34 and splice module 32 may be positioned above the active connection and storage areas.

Figure 4:
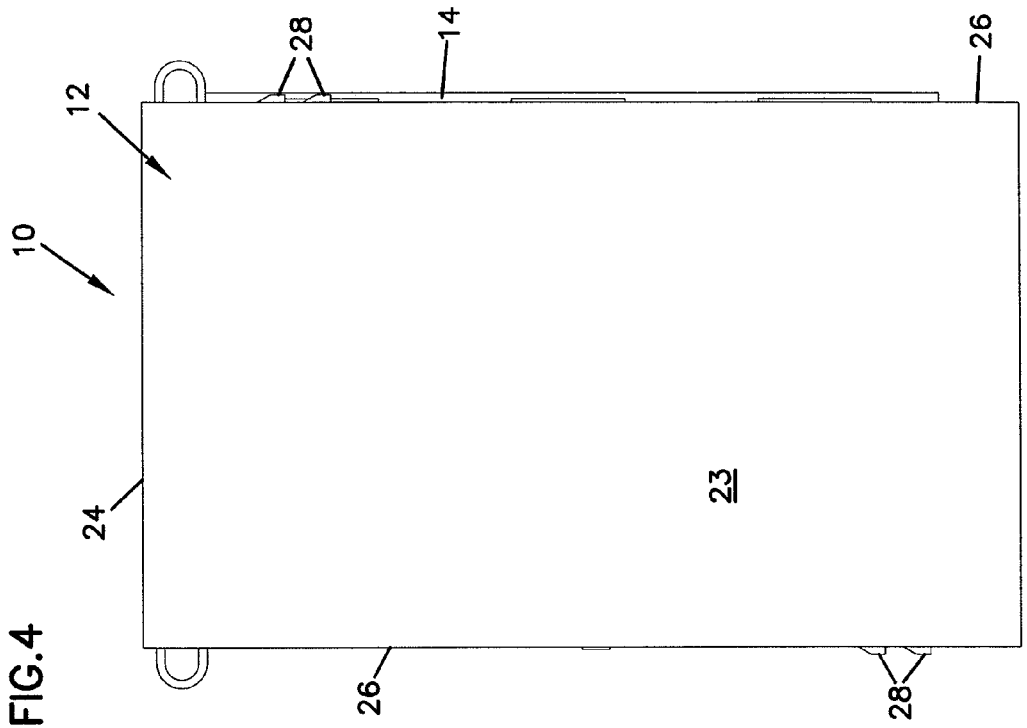
FIG. 4 is a rear view of the telecommunications connection cabinet of FIG. 3.
Figure 3:
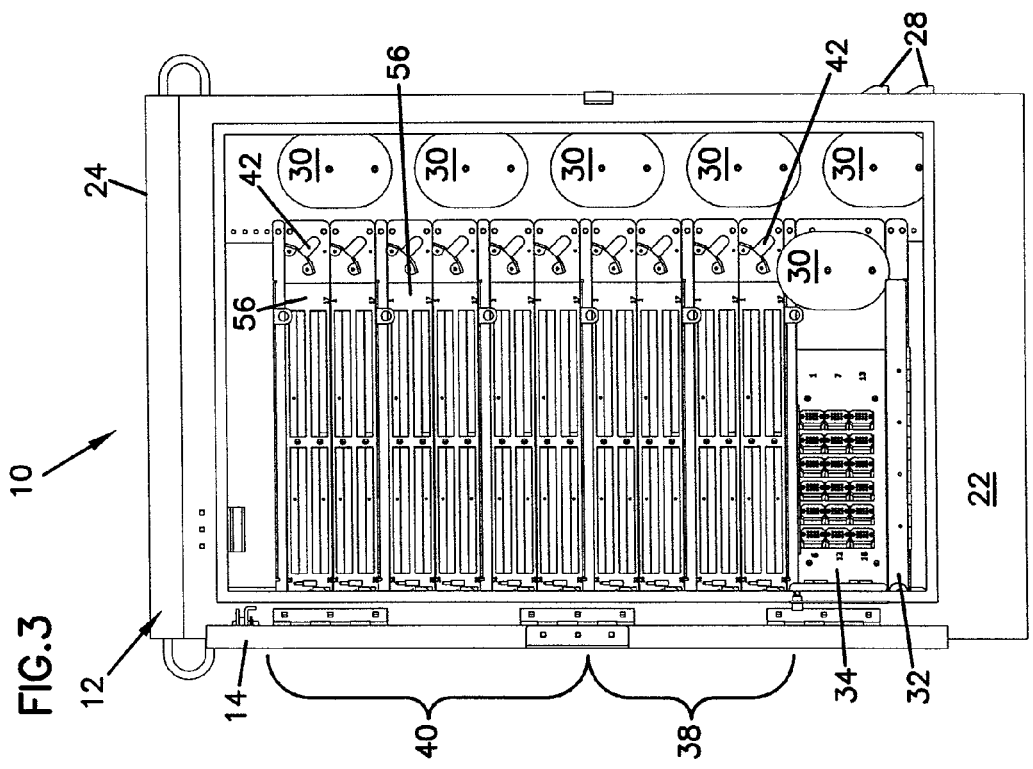
FIG. 3 is a front view of the telecommunications connection cabinet of FIG. 1 with the adapters and connector holders removed.
Figure 6:
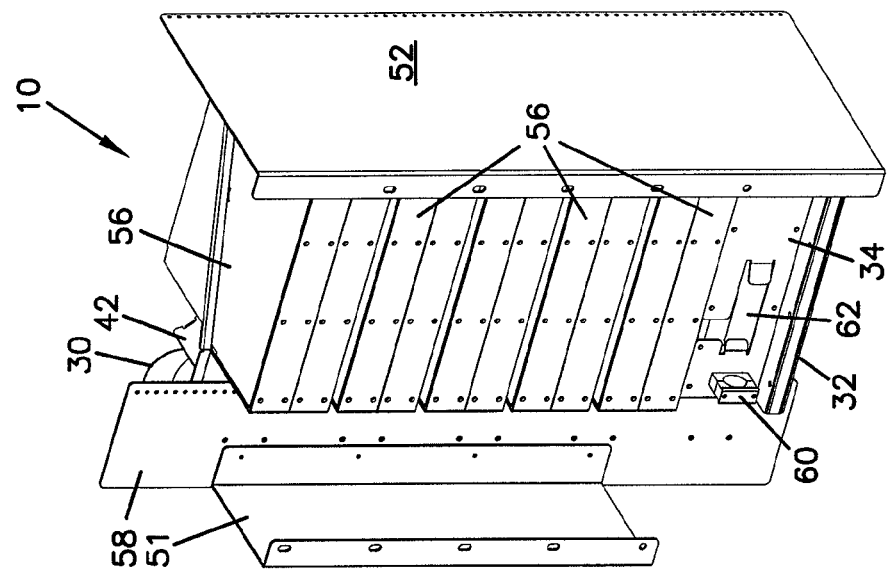
FIG. 6 is a rear perspective view of the rack, modules and cable management structures of FIG. 5.
Figure 5:
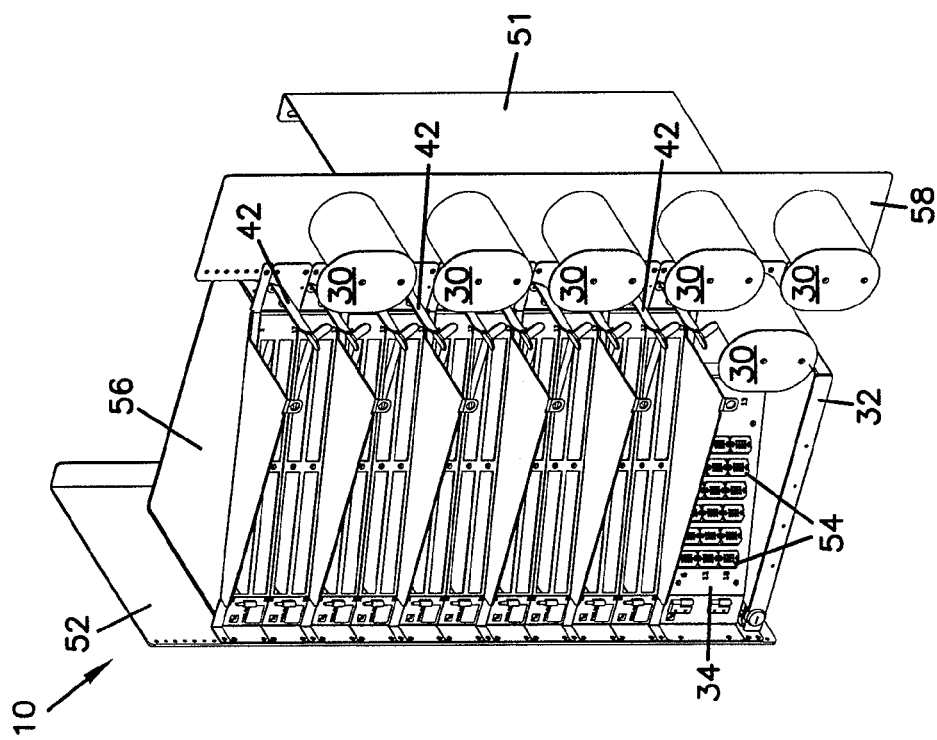
FIG. 5 is a front perspective view of the rack, modules and cable management devices of the telecommunications cabinet of FIG. 1 removed from the cabinet.
Figure 8:
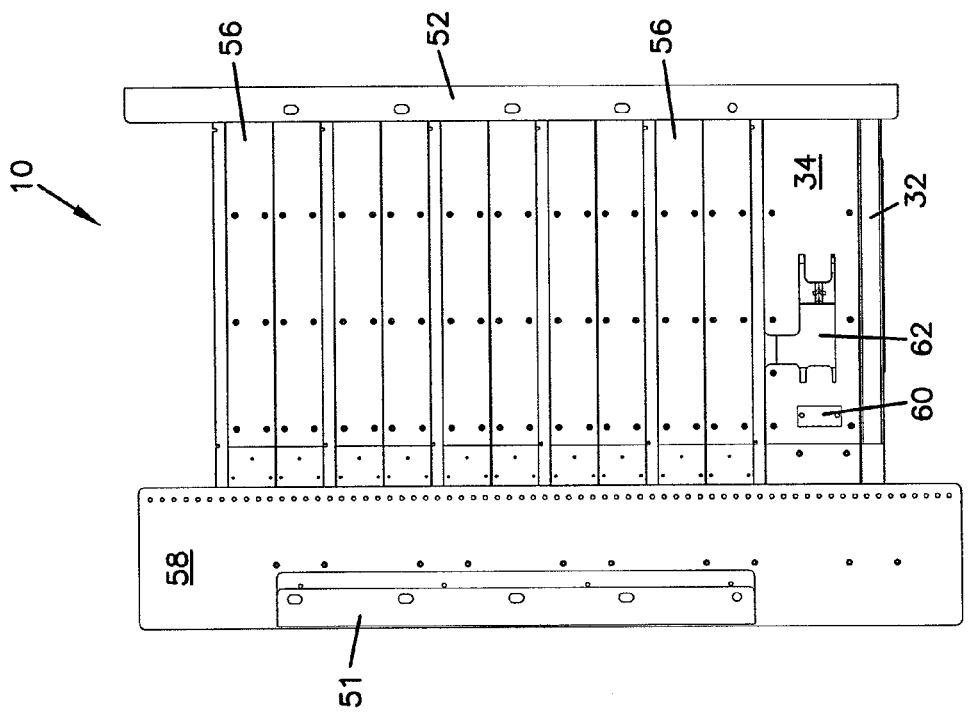
FIG. 8 is a rear view of the rack, modules and cable management structures of FIG. 5.
Figure 7:
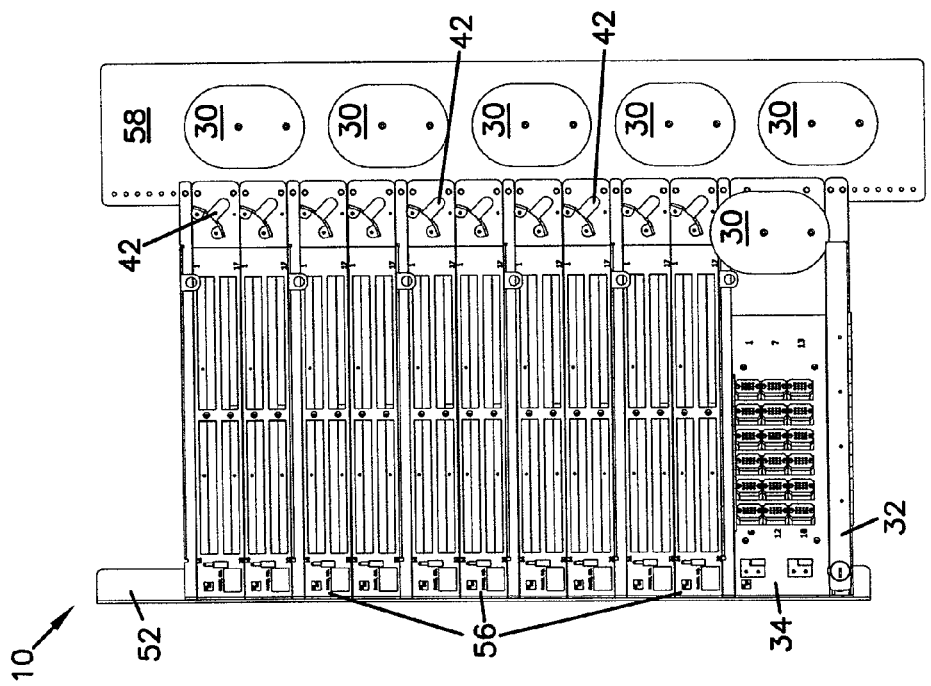
FIG. 7 is a front view of the rack, modules and cable management structures of FIG. 5.

Referring now also to FIGS. 3 and 4, cabinet 10 is configured to be a front access cabinet and no provision is made for allowing access through rear wall 23. In the field, a technician would only need to access the equipment mounted within cabinet 10 through front opening 16 to connect or disconnect a particular customer's circuit. All connections between the various equipment behind the equipment in the interior 13 are not easily accessible and are anticipated to be pre-configured and cabled before cabinet 10 leaves the manufacturing facility. Alternatively, rear wall 23 could be configured with an access door if such access is desired.

Modules 34, 36 and 37 include front faces which are angled with respect to front wall 22 to improve the positioning of cables between the cable management structures (including spools 30 and radius limiters 42) and adapters 50 and connector holders 110.

As shown in FIGS. 3 and 4, connector holders 110, adapters 50 and any splitters within modules 36 and 37 have been removed. The module housing 56 for each module 36 and 37 may be identical and will be described further below. As shown in FIGS. 1 and 2, each module 37 includes 32 connector holders in each of seven connector holder modules 37. This provides a total storage capacity as configured of 224 connectors 200.

Fanout module 34 as shown in the FIGS. includes eighteen cable breakouts 54. Each cable breakout 54 allows for separation of a service cable or subunit of a service cable into a maximum of 12 fibers. This provides a maximum capacity for fanout module 34 to receive up to eighteen service cables or subunits of service cables, and separate out up to 216 patch cords 46 and 48 from these service cables. This permits a connector holder in storage area 40 for each of the maximum number of patch cords 46 and 48 that may extend from fanout module 34.

Patch cords 46 and 48 may be terminated with fiber optic connectors such as connector 200 shown in FIGS. 22 through 28, below. Optical fiber within these cables may be terminated at a polished end face held by a ferrule 202 in connector 200, as is well known in the art and shown in U.S. Pat. No. 5,317,663, incorporated herein by reference. These polished end faces and ferrules 202 need to be stored and protected until needed for connecting to other fiber optic cables or optical signal equipment.

Often a dust cap 204 may be placed about ferrule 202 and the polished end face of the optical fiber to protect the polished end face from contamination from dust, fingerprints or other items which might degrade optical signal transmission. While it is known to store these in known optical fiber adapters until the fiber within the attached cable is needed to connect to another fiber optic cable to optical signal equipment, such storage is less than ideal as adapters do not seal the polished end face from contamination as well as dust cap 204 securely fit and held about ferrule 202 of connector 200. Known adapters do not permit insertion of connector 200 which still has dust cap 204 in place about ferrule 202 and the polished end face of the cable.

Referring now to FIGS. 15 and 16, connector holder 110 includes a main housing 112 defining an interior cavity 114. An open end 118 permits insertion of a connector 200 into cavity 114 while an opposite opening 116 permits dust cap 204 to protrude from connector holder 10. A clip 120 is positioned about main housing 112 and includes a pair of spring mounting clips 122. A pair of flanges 124 extends from opposing sides 126 of main housing 112 adjacent spring clips 122. Clips 122 and flanges 124 cooperate to releasably mount holder 10 to an opening in a bulkhead as is shown below.

Main housing 112 also includes a bottom 130 with a keyway 128 to receive a keyed extension of connector 200 to consistently orient connector 200 for insertion into cavity 114. Opposite bottom 130 is an open top closed by a cover 132. This is shown in more detail in FIG. 26, below. FIGS. 17 through 21 provide additional views of connector holder 110.

Referring now to FIGS. 22 through 27, connector 110 is shown with connector 200 positioned within cavity 118. Dust cap 204 extends from opening 116 of connector holder 110 while connector 200 is inserted through open end 114.

Referring now to FIGS. 27 and 28, connector holder 110 further includes an inner housing 134 with a pair of opposing releasable catches 136 and an opening 138 sized to receive dust cap 204. Inner housing 134 is positioned within main housing 112 through an open top 140 with opening 138 adjacent opening 116 and catches 136 adjacent open end 114. Cover 132 is then positioned within open top 140 and clip 120 placed about cover 132 and main housing 112. Cover 132 may be sealed within open top 140 by gluing, ultrasonic welding or a variety of known fastening techniques. Connector 200 includes a pair of opposing recesses 206 which receive catches 136 when connector 200 is inserted within holder 110.

As shown, connector 200 and holder 110 are SC style. Connector 200 and holder 110 may conform to other styles and formats of electrical connectors and adapters without straying from the spirit of the present invention.

Figure 29:
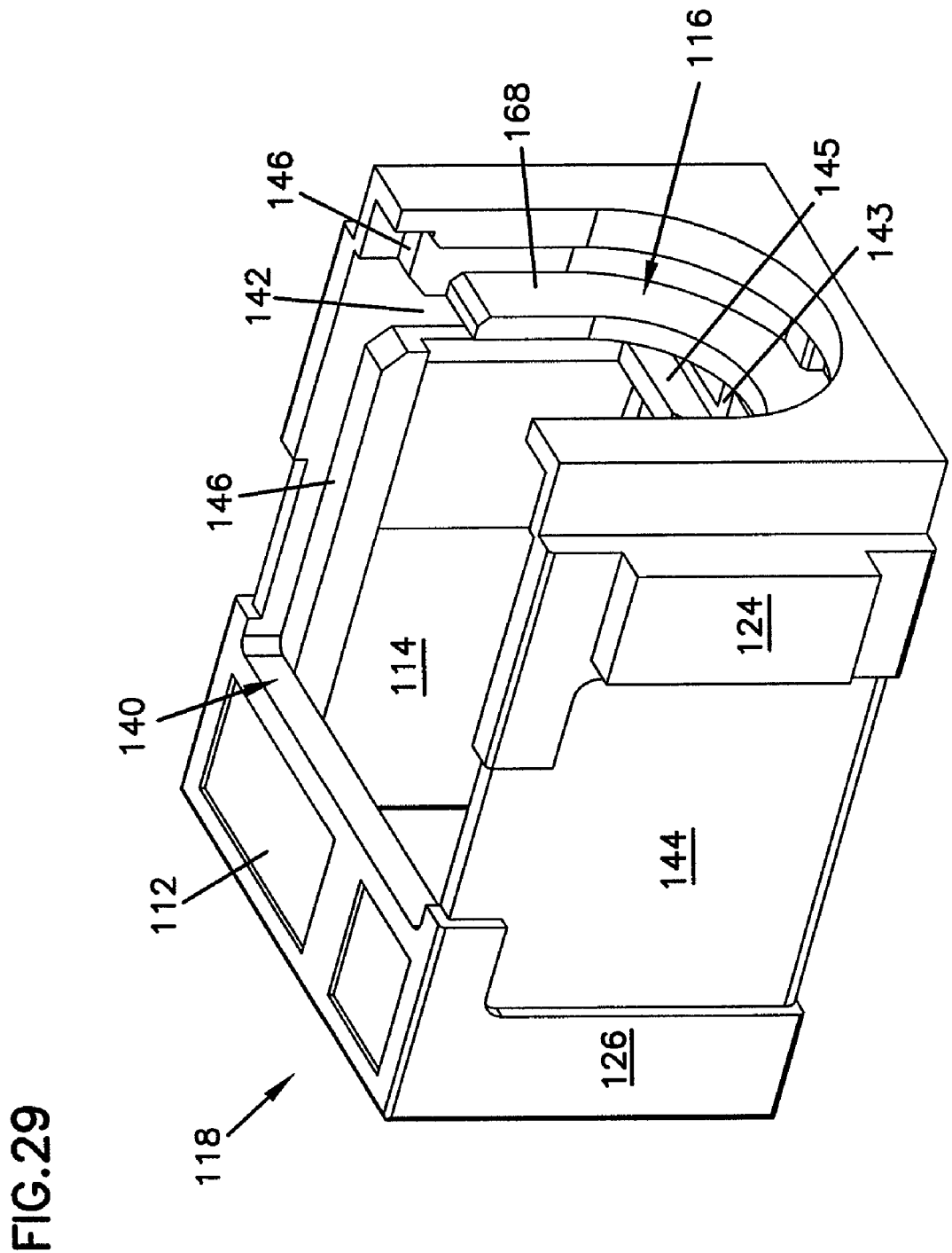
FIG. 29 is a perspective view of the main housing of the fiber optic connector holder of FIG. 15.
Figure 43:
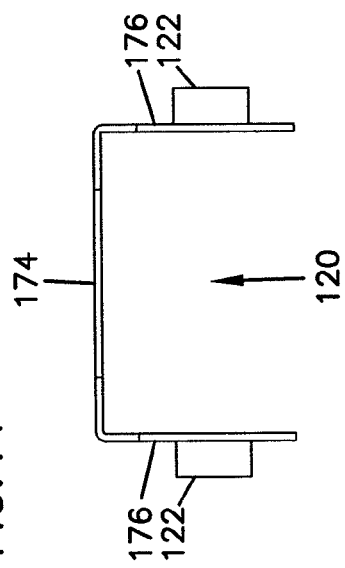
FIG. 43 is a perspective view of the clip of the fiber optic connector holder of FIG. 29.
Figure 44:
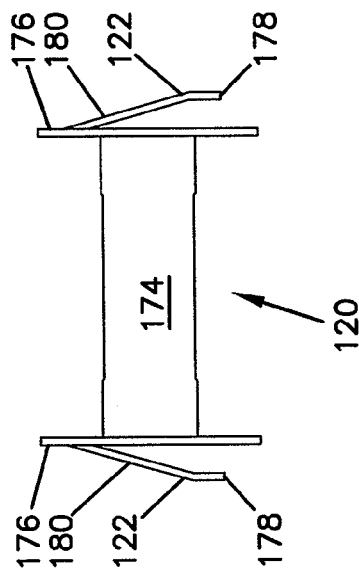
FIG. 44 is an end view of the clip of FIG. 43.
Figure 45:
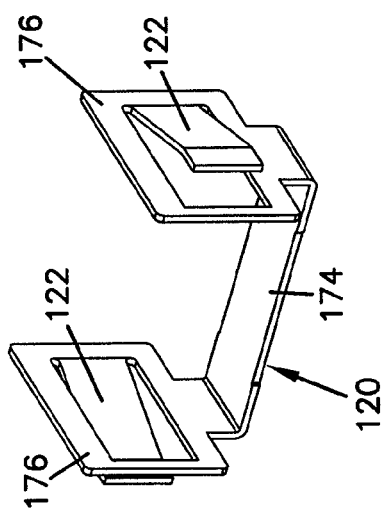
FIG. 45 is a side view of the clip of FIG. 43.
Figure 46:
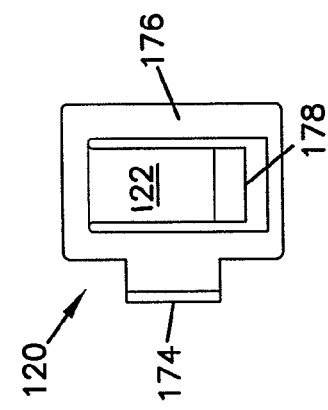
FIG. 46 is a bottom view of the clip of FIG. 43.

Referring now to FIG. 29, main housing 112 also includes a slot 142 along both sides of cavity 114 to receiving and positioning a flange of inner housing 134 within cavity 114. A recess 144 is provided along sides 126 to receive clip 120. Open top 140 includes a ledge 146 upon which cover 132 is positioned to close cavity 114. An outer bulkhead 168 forms a portion of opening 116. An inner bulkhead 145 is positioned spaced apart from outer bulkhead 168 and these bulkheads cooperate to define slot 142. Between bulkheads 145 and 168 is a positioning surface 143 defining the bottom of slot 142.

Referring now to FIGS. 30 to 35, inner housing 134 includes a pair of clip arms 148 extending from a cross piece 150. Opening 138 for receiving dust cap 204 of connector 200 is in cross piece 150. Catches 136 are at the end of clip arms 148 opposite cross piece 150. Cross piece 150 includes a pair of flanges 152 which are received in slots 142 in main housing 112. As shown in FIG. 32, catches 136 include a ramped portion 154 which is engaged by connector 200 as connector 200 is inserted within cavity 114 through open end 118 of connector holder 110. Clip arms 148 are deflected outward allowing connector 200 to pass between catches 136. When connector 200 is fully inserted within cavity 114 (as shown in FIG. 27) catches 136 are received within recesses 206 and a retaining surface 156 of each catch 136 holds connector 200 within cavity 114.

Inner housing 134 is configured to permit insertion within slots 142 of cavity 114 of main housing 112 in either of two orientations. A pair of edges 166 of cross piece 150 properly position inner housing within cavity 114 with regard to cover 132 and main housing 112 so that opening 138 is aligned to receive dust cap 204.

Referring now to FIGS. 36 to 42, cover 132 includes a recess 158 for receiving clip 120 along an outer surface 168. Also in outer surface 168 is a recess 172 for receiving indicia. Along an inner surface 170 are formed a pair of edges 164 configured to be received upon ledges 146 of main housing 112. Extending from inner surface 170 is an outer flange 160 which cooperates with bulkhead 168 within main housing 112 to define opening 116. Also extending from inner surface 170 is an inner flange 162 which is spaced apart from outer flange 160 to form a slot 163. Slot 163 cooperates within slot 142 of main housing 112 to receive flanges 152 of inner housing 134.

At the top of slot 163 is a positioning surface 161 which cooperates with one of edges 166 of inner housing 134 to position inner housing 134 within cavity 114 so that opening 138 of inner housing 134 is aligned with opening 116. When assembled as connector holder 110, positioning surface 143 of main housing 112 and positioning surface 161 of cover 132 cooperate to engage both edges 166 of inner housing 134. Slot 142 of main housing 112 and slot 163 of cover 132 cooperate to capture flanges 152 of inner housing 134.

Referring now to FIGS. 43 to 46, clip 120 includes a cross piece 174 and a pair of opposing sides 176. Spring clips 122 are formed in sides 176. Sides 176 are received within recesses 144 of main housing 112 and cross piece 174 is received within recess 158 of cover 132. It is anticipated that clip 120 will be made of a resilient deformable metal to facilitate insertion and removal from an opening in a bulkhead. Spring clips 122 each include an end 178 and a ramped surface 180.

Figure 48:
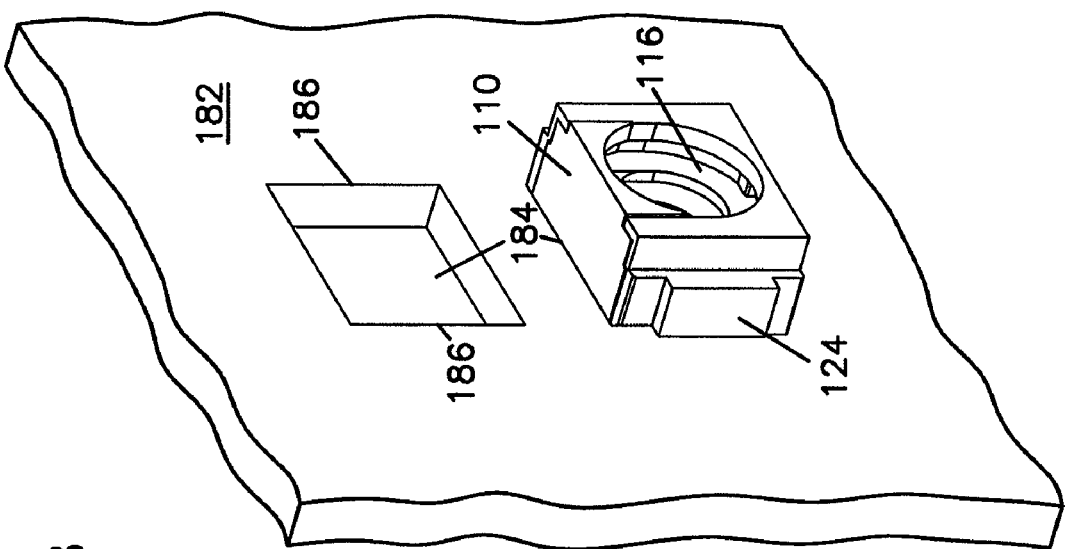
FIG. 48 is a perspective view of a bulkhead including a plurality of openings for receiving fiber optic connector adapters and the fiber optic connector holder of FIG. 15 inserted within one of the openings.
Figure 47:
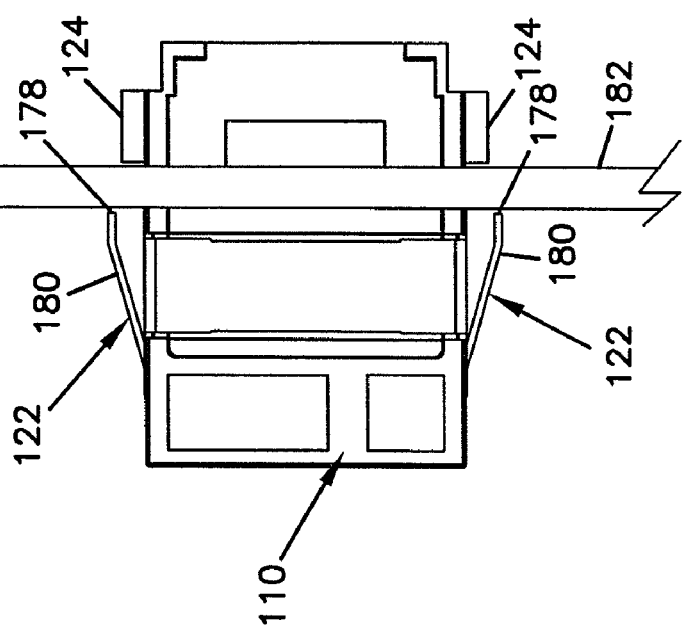
FIG. 47 is a top view of the fiber optic connector holder of FIG. 15 inserted within an opening in a bulkhead.
Figure 52:
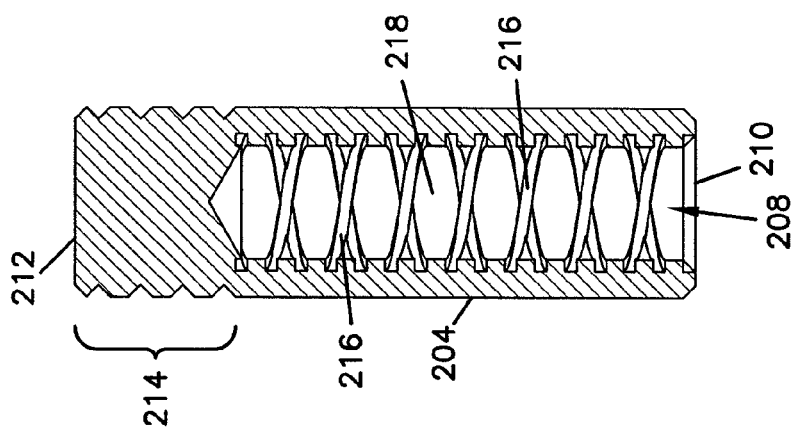
FIG. 52 is a cross-sectional view of the dust cap of FIG. 49.
Figure 51:
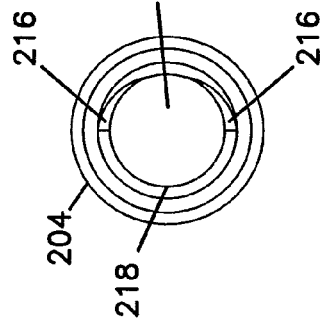
FIG. 51 is an end view of the dust cap of FIG. 49.
Figure 50:
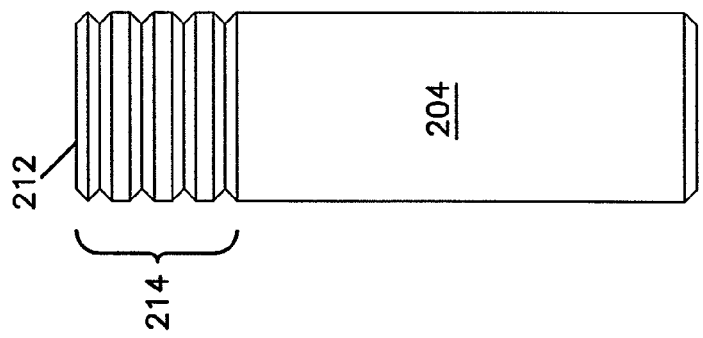
FIG. 50 is a side view of the dust cap of FIG. 49.
Figure 49:
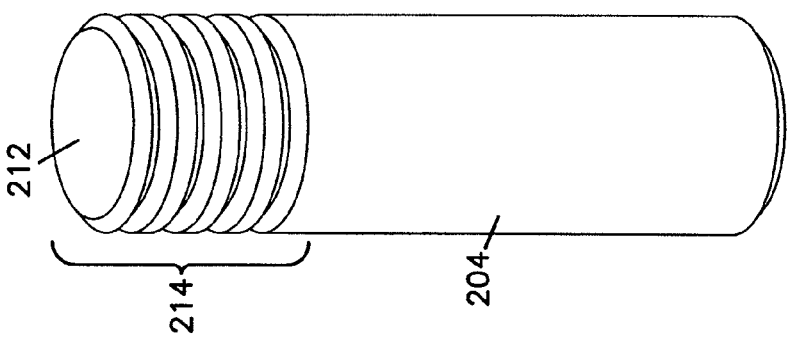
FIG. 49 is a perspective view of the dust cap of the fiber optic connector of FIG. 29.

FIGS. 47 and 48 shows fiber optic connector holder 110 inserted within an opening 184 in a bulkhead 182. Bulkhead 182 may be part of a piece of telecommunications switching equipment such as a panel for making a plurality of connections between optical fiber cables including a plurality of openings 84 for adapters, as shown in FIG. 48, or in connector holder module 37. Alternatively, bulkhead 182 may include only a single opening 184 where only a single fiber optic connector holder 110 is needed.

Open end 118 of connector holder 110 is inserted through opening 184 until a pair of sides 186 of opening 184 engage ramped surfaces 180 of spring clips 122. Continued insertion of connector holder 110 will cause bulkhead sides 186 to deflect spring clips 122 inward toward sides 126. Bulkhead sides 186 will eventually pass beyond ends 178 of spring clips 122. Spring clips 122 will then spring back as shown in FIG. 48, capturing bulkhead sides 186 between ends 178 and flanges 124. Connector holder 110 may be removed from opening 184 by compressing spring clips 122 and removing in a direction opposite the insertion described above.

Alternatively, flanges 124 may be configured to include a fastener opening so that connector holder 110 can be mounted within opening 184 by removable fasteners.

It is anticipated that openings 184 for mounting adapters and connector holders may be included in sliding adapter packs, such as described in commonly-owned U.S. Pat. No. 5,497,444. The disclosure of this patent is incorporated herein by reference.

Referring now to FIGS. 49 through 52, dust cap 204 includes a central opening 208 to receive ferrule 202 when ferrule 202 is inserted through open end 210. Opposite open end 210 is closed end 212 which includes knurling 214 to provide better grip for removing dust cap 204. Central opening 208 fits about ferrule 202 to provide a seal about ferrule 202 and to hold dust cap to connector 200. Due to the reduction of air volume within central opening 208 when ferrule 202 is inserted (see FIG. 27), one or more helix shaped recesses 216 are provided within central opening 208 along inner walls 218. Recesses 216 extend from adjacent closed end 212 to open end 210. Recesses 216 are small enough prevent entry of unwanted contaminants and still permit air displaced within central opening 208 to be expelled when ferrule 202 is inserted so that dust cap 204 may be fully seat to connector 200. Recesses 216 also allow air to pass into central opening 208 when dust cap 204 is withdrawn from ferrule 202. The shape of each recess 216 is also designed to allow passage of air into and out of central opening 208 when dust cap 204 is removed or placed on ferrule 202 while inhibiting the passage of contaminants along the same path.

Referring now to FIGS. 5 through 8, cabinet 10 is shown without housing 12. A pair of vertical supports 51 and 52 adjacent sides 26 of housing 12 provide mounting locations for the equipment mounted in cabinet 10. A cable management panel 58 is mounted to vertical support 51, and a plurality of cable spools 30 are mounted to panel 58. Bend radius protectors 42 are mounted to each module housing 56 adjacent panel 58 and provide bend radius protection for cables 46 and 48 being directed from spools 30 to modules 36 or 37.

Mounted to the rear of fanout module 34 is a cable clamp 60 for securing the service cable after it enters cabinet 10 through opening 18 in bottom 20. From clamp 60, the service cable, sub-units of the service cable or smaller bundles of optical fibers may enter fanout module 34 through rear opening 62. In addition to spools 30 mounted to panel 58, another spool 30 is mounted to the front of fanout module 34 to provide bend radius protection and direct patch cords 46 and 48 from cable breakouts 54 into cable spools 30 of panel 58 and radius protectors 42 of modules 36 and 37.

Figure 9:
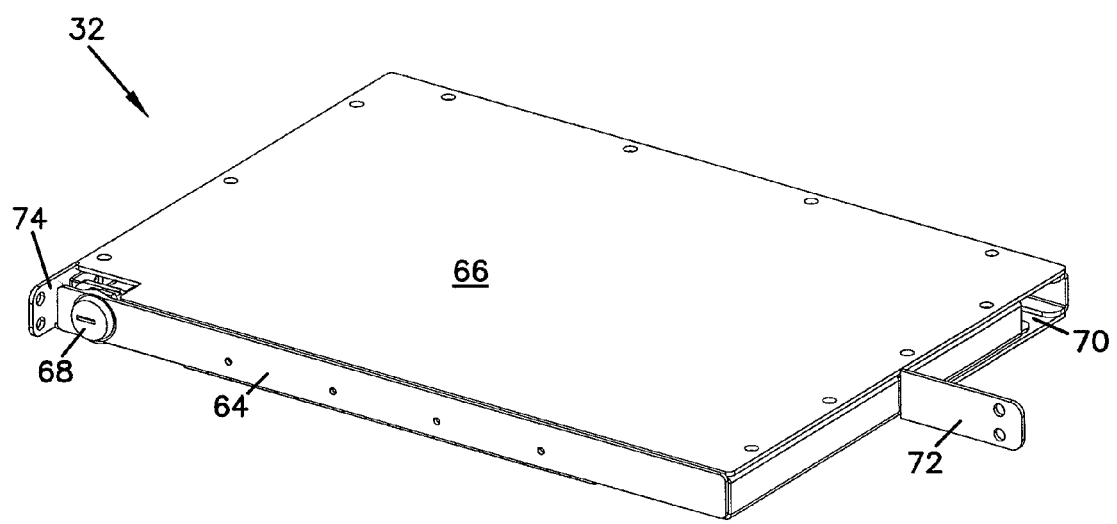
FIG. 9 is a front perspective view of a splice drawer module for use with telecommunications connection cabinet of FIG. 1.
Figure 10:
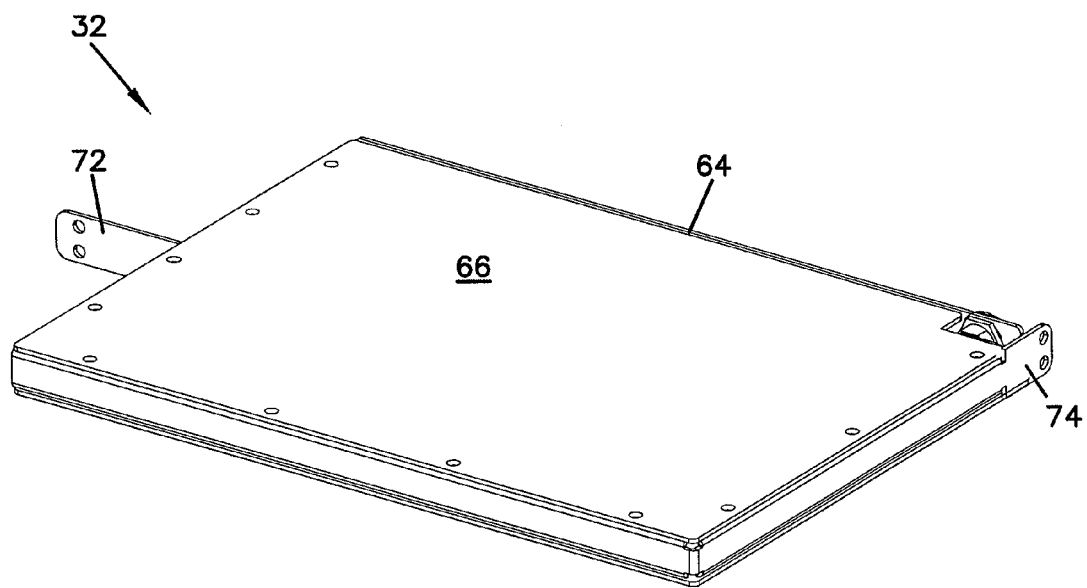
FIG. 10 is a rear perspective view of a splice drawer module for use with telecommunications connection cabinet of FIG. 1.

Referring now to FIGS. 9 and 10, splice module 32 includes a splice drawer 64 slidably mounted within a housing 66. Splice module housing 66 includes a pair of mounting flanges 72 and 74 for mounting splice module 32 to panel 58 and vertical support 52. A locking drawer latch 68 is included in drawer 64 to prevent unwanted or accidental access to the splices within splice module 32. A rear opening 70 is provided to permit cables from modules 36 to enter housing 66 and be spliced in drawer 64.

Figure 11:
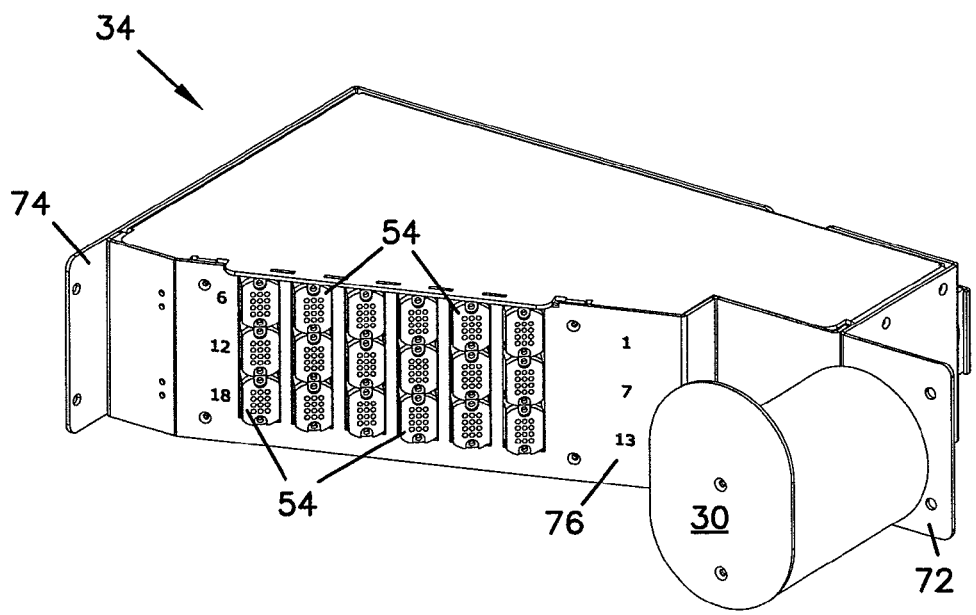
FIG. 11 is a front perspective view of a fanout module for use with telecommunications connection cabinet of FIG. 1.
Figure 12:
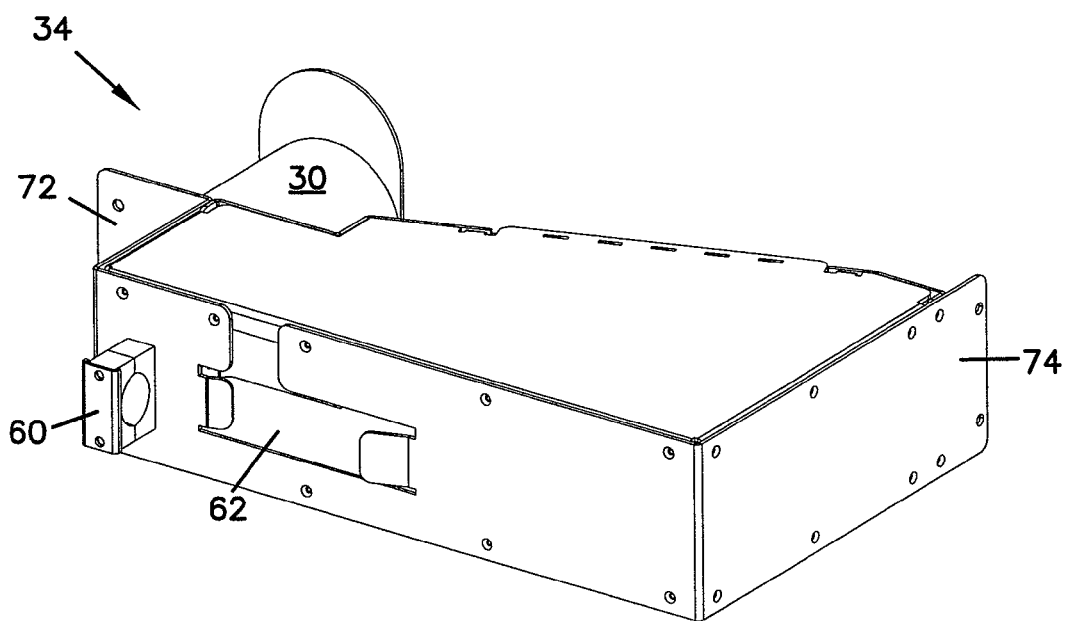
FIG. 12 is a rear perspective view of a fanout module for use with telecommunications connection cabinet of FIG. 1.

Referring now to FIGS. 11 and 12, fanout module 34 includes a front face to which are mounted the eighteen cable breakouts 54. Fanout module 34 also includes a flange 72 for mounting to panel 58 and a flange 74 for mounting to vertical support 52.

Figure 13:
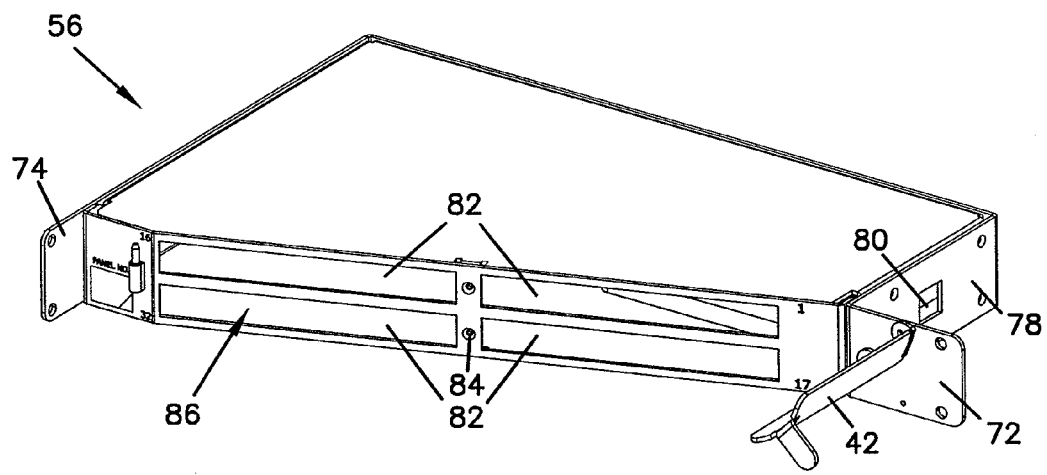
FIG. 13 is a front perspective view of a chassis for the splitter module or the adapter module of telecommunications connection cabinet of FIG. 1.
Figure 14:
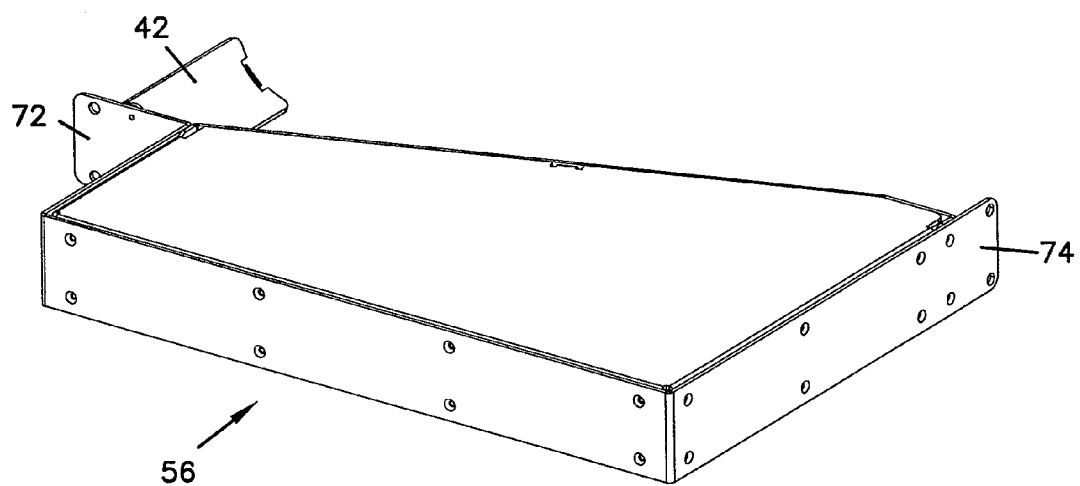
FIG. 14 is a rear perspective view of a chassis for the splitter module or the adapter module of telecommunications connection cabinet of FIG. 1.

Referring now to FIGS. 13 and 14, module housing 56 provides the basic shell for both adapter module 36 and connector holder module 37. Housing 56 includes a front face 84 with four openings 84. Openings 84 are sized and configured to receive up to eight adapters 50 or connector holders 110, so that a total of thirty-two patch cords 46 or 48 can be received. These adapters 50 or connector holders 110 may be held within opening 84 by a retainer clip such as that disclosed in commonly-owned U.S. Pat. No. 5,214,735, the disclosure of which is incorporated herein by reference. Module housing 56 also defines an interior space 86 with a cable exit 80 in a side wall 78. When module housing 56 is used for an adapter module 36, each adapter 50 mounted in openings 84 may have a connector 200 inserted into a rear side that will be optically linked with a connector 200 of patch cord 46 inserted into a front side. These rear connectors 200 may terminate fiber optic cables which may then extend through cable exit 80.

Alternatively, adapter module 36 may include a splitter within interior 86. Then, the connectors 200 attached to the rear of each adapter 50 would be optically connected to the splitter. The splitter would then combine the signals from each of the adapters 50 for a given module 36 into a single optical fiber cable which may then be directed out of module 36 through cable exit 80 and to rear opening 70 of splice module 32. Within splice module 32, each of the cables carrying the combined signals from the patch cords 46 connected to up to thirty-two adapters of a module 36 could be spliced into another cable for distribution of the signals to downstream equipment or customers.

As shown in the FIGS., cabinet 10 is configured for front access only, as no provision is made for an access opening through rear wall 23. Other configurations of housing 12 for cabinet 10 are contemplated, which may include providing additional access into interior 13. A preferred method of connecting a fiber optic service cable in cabinet 10 reduces the need access to the rear of the equipment mounted within housing 12.

To connect a service cable within cabinet 10, the service cable is fed into cabinet 10 through opening 18 in bottom 20. The service cable is directed into a space between the equipment mounted to vertical supports 51 and 52 and rear wall 23 and then clamped to the rear of fanout module 34 at clamp 60. From clamp 60, the cable may be broken out into sub-units and directed through opening 62 into an interior 61 of fanout module 34. Within interior 61, the sub-units of cable are further broken down to the individual fibers which are lead to cable breakouts 54 where they are passed out of interior 61 and preferably up-jacketed to standard patch cords 46 or 48 terminated with connectors 200. Patch cords 46 and 48 are anticipated to standard size patch cords such as 1.7 mm, 2.0 mm, or otherwise appropriately sized for routing within cabinet 10.

From the breakouts 54, patch cords 46 and 48 are lead over spool 30 mounted to fanout module 34 and to the spools 30 mounted to panel 58. From these spools, the patch cords 46 and 48 are led past radius protectors 42 and connectors 200 inserted within an adapter 50 and a connector holder 110, respectively. Patch cords 46, as described above, are optically linked through adapter 50 and possibly a splitter within interior 86 of adapter module 36 to splice module 32 and then to downstream equipment. As described above, patch cords 48 are stored for future use in connector holders 110 with dust cap 104 in place to protect the polished end faces from damage or contamination.

When one of the stored or inactive patch cords 48 is needed for connection to downstream equipment, for instance when a new customer requests service or an existing customer needs to expand service, the desired inactive patch cord 48 is removed from connector holder 110. Dust cap 104 is removed from ferrule 102 of connector 200 and patch cord 48 is partially removed from spools 30 mounted to panel 58. This patch cord is then rerouted so that its connector 200 is adjacent the desired adapter 50 for connecting to downstream equipment. At this point, the former inactive patch cord 48 has become an active patch cord 46 and is inserted into the appropriate adapter 50. An active patch cord 46 may be converted to an inactive patch cord 48 by a reversal of the above process when a previously required circuit is no longer needed by a customer or other downstream equipment.

By configuring cabinet 10 as described above, only front access through access opening 16 is necessary in the field for a technician to connect a circuit for a new customer or an existing customer or to take a circuit out of service.

The above specification, examples and data provide a complete description of the manufacture and use of the composition of the invention. Since many embodiments of the invention can be made without departing from the spirit and scope of the invention, the invention resides in the claims hereinafter appended.

The invention claimed is:

1. A telecommunications connection cabinet comprising:
   a housing including an access opening for accessing an interior of the housing, the housing also including at least one door for opening and closing the access opening;
   a termination region positioned within the interior of the housing, the termination region including a plurality of telecommunications adapters, each telecommunications adapter being configured for coupling together two fiber optic connectors such that an optical interconnection is made between the two fiber optic connectors;
   a fiber optic splitter mounting location positioned within the housing;
   a connector storage region located within the housing, the storage region defining a plurality of openings allotted to removably mount connector holders at the connector storage region;
   at least a first connector holder configured to mount within the housing at the connector storage region; and
   a first fiber optic connector held by the first connector holder, the first fiber optic connector including a ferrule and a dust cap securely fit and held about the ferrule when the first fiber optic connector is held at the first connector holder, the dust cap including a closed end opposite an open end and defining an opening that receives the ferrule of the first fiber optic connector to provide a seal about the ferrule and to hold the dust cap to the first fiber optic connector.

2. The telecommunications connection cabinet of claim 1, wherein one of the two fiber optic connectors can be held at the connector storage region when not being used for service.

3. The telecommunications connection cabinet of claim 1, wherein the first connector holder blocks access to a first end of the first fiber optic connector when the first fiber optic connector is held by the first connector holder, the ferrule of the first fiber optic connector being located at the first end of the first fiber optic connector.

4. The telecommunications connection cabinet of claim 1, wherein the first connector holder is not configured to couple together the two fiber optic connectors such that an optical interconnection is made between the two fiber optic connectors.

5. The telecommunications connection cabinet of claim 1, further comprising a plurality of first fiber optic cords, each fiber optic cord having an end that terminates at a fiber optic connector held at the connector storage region.

6. The telecommunications connection cabinet of claim 1, further comprising a bulkhead mounted within the interior of the housing, the bulkhead defining openings sized to fit the telecommunications adapters and defining the openings of the connector storage region, wherein the openings of the connector storage region have the same footprint as the openings sized to fit the telecommunications adapters.

7. The telecommunications connection cabinet of claim 1, wherein the first connector holder includes at least one resilient member that flexes when the first fiber optic connector is inserted into the first connector holder.

8. The telecommunications connection cabinet of claim 7, wherein the at least one resilient member engages an exterior of the first fiber optic connector.

9. The telecommunications connection cabinet of claim 1, wherein the ferrule of the first fiber optic connector defines a longitudinal axis, and wherein the longitudinal axis is not generally vertically oriented when the first fiber optic connector is held by the first connector holder at the connector storage region.

10. The telecommunications connection cabinet of claim 9, wherein the longitudinal axis is generally horizontal when the first fiber optic connector is held by the first connector holder at the connector storage region.

11. The telecommunications connection cabinet of claim 1, wherein the first connector holder comprises:
a main housing defining a top, a bottom, a pair of opposing sides, and a cavity with an open end sized to receive the first fiber optic connector with the dust cap mounted on the ferrule of the first fiber optic connector;
an inner housing disposed within the main housing and including a dust cap opening sized to receive the dust cap when the first fiber optic connector is received in the open end of the main housing;
the inner housing including at least one retaining clip which releasably latches onto the first fiber optic connector and releasably holds the first fiber optic connector within the open end of the main housing.

12. The telecommunications connection cabinet of claim 11, further comprising a bulkhead mounted within the interior of the housing, wherein an outer clip is fitted about the main housing of the first connector holder, the outer clip including at least one releasable catch positioned along one of the sides of the main housing for engaging an opening defined in the bulkhead to secure the first connector holder to the bulkhead.

13. The telecommunications connection cabinet of claim 11, wherein the inner housing includes a pair of retaining clips which releasably engage recesses extending along the first fiber optic connector when the first fiber optic connector is received in the open end of the main housing.

14. The telecommunications connection cabinet of claim 13, wherein the main housing of the first connector holder does not include a second open end for receiving a second fiber optic connector.

15. The telecommunications connection cabinet of claim 11, wherein the main housing of the first connector holder includes an open top sized to permit the inner housing of the first connector holder to be inserted within the cavity and a cover sized to fit within and close off the open top.

16. The telecommunications connection cabinet of claim 15, wherein the cover is a separate piece from the main housing and is attached to the main housing within the open top to hold the inner housing within the cavity.

17. The telecommunications connection cabinet of claim 1, wherein the first fiber optic connector includes a grip housing mounted over a connector body, and wherein at least a portion of the grip housing is held by the first connector holder when the first fiber optic connector is stored at the connector storage region.

18. A telecommunications connection cabinet comprising:
a housing including an access opening for accessing an interior of the housing, the housing also including at least one door for opening and closing the access opening;
a termination region positioned within the interior of the housing, the termination region including a plurality of telecommunications adapters, each telecommunications adapter being configured for coupling together two fiber optic connectors such that an optical interconnection is made between the two fiber optic connectors;
a fiber optic splitter mounting location positioned within the housing;
a connector storage region located within the housing, the connector storage region including a first connector holder; and
a first fiber optic connector held by the first connector holder at the connector storage region, each fiber optic connector including a ferrule, a dust cap, and a grip housing, wherein the dust cap is securely fit and held about the ferrule of the first fiber optic connector when the fiber optic connector is held at the first connector holder, the dust cap including a closed end opposite an open end and defining an opening that receives the ferrule of the first fiber optic connector to provide a seal about the ferrule and to hold the dust cap to the first fiber optic connector; and wherein at least a portion of the grip housing is held by the first connector holder when the first fiber optic connector is stored at the connector storage region.

19. A telecommunications connection cabinet comprising:
a housing including an access opening for accessing an interior of the housing, the housing also including at least one door for opening and closing the access opening;
a termination region positioned within the interior of the housing, the termination region including a plurality of telecommunications adapters, each telecommunications adapter being configured for coupling together two fiber optic connectors such that an optical interconnection is made between the two fiber optic connectors;

a fiber optic splitter mounting location positioned within the housing;

a connector storage region located within the housing, the connector storage region including a plurality of connector holders that are configured to hold fiber optic connectors, each connector holder having at least a portion that deflects when the connector holder receives one of the fiber optic connectors; and a plurality of fiber optic connectors held by the connector holders at the connector storage region, each fiber optic connector including a ferrule and a dust cap that is securely fit and held about the ferrule when the respective fiber optic connector is held at one of the connector holders, each dust cap including a closed end opposite an open end and defining an opening that receives the ferrule of the respective fiber optic connector to provide a seal about the ferrule and to hold the dust cap to the fiber optic connector.

20. A telecommunications connection cabinet comprising:

a housing including an access opening for accessing an interior of the housing, the housing also including at least one door for opening and closing the access opening;

a termination region positioned within the interior of the housing, the termination region including a plurality of telecommunications adapters, each telecommunications adapter being configured for coupling together two fiber optic connectors such that an optical interconnection is made between the two fiber optic connectors;

a fiber optic splitter mounting location positioned within the housing;

a connector storage region located within the housing, the connector storage region including a first connector holder; and a first fiber optic connector held by the first connector holder at the connector storage region, the first fiber optic connector including a ferrule defining a longitudinal axis and a dust cap that is securely fit and held about the ferrule when the first fiber optic connector is held at the first connector holder, the dust cap including a closed end opposite an open end and defining an opening that receives the ferrule to provide a seal about the ferrule and to hold the dust cap to the first fiber optic connector, the longitudinal axis of the ferrule extending non-vertically when the first fiber optic connector is held by the first connector holder at the connector storage region.

21. A telecommunications connection cabinet comprising:

a housing including an access opening for accessing an interior of the housing, the housing also including at least one door for opening and closing the access opening;

a termination region positioned within the interior of the housing, the termination region including a plurality of telecommunications adapters, each telecommunications adapter being configured for coupling together two fiber optic connectors such that an optical interconnection is made between the two fiber optic connectors;

a fiber optic splitter mounting location positioned within the housing;

a connector storage region located within the housing, the connector storage region including a panel to which a plurality of storage components can be mounted;

a first storage component mounted to the panel at the connector storage region, the first storage component including a resilient portion that snap-fits to the panel to mount the first storage component to the panel; and a first fiber optic connector held by the storage component at the connector storage region, the first fiber optic connector including a ferrule and a dust cap securely fit and held about the ferrule when the first fiber optic connector is held at the first storage component, the dust cap including a closed end opposite an open end and defining an opening that receives the ferrule of the first fiber optic connector to provide a seal about the ferrule and to hold the dust cap to the first fiber optic connector.

22. The telecommunications connection cabinet of claim 21, wherein the resilient portion of the first storage component includes an outer clip.

23. The telecommunications connection cabinet of claim 22, wherein the outer clip includes a cross piece and a spring clip formed on either side of the cross piece.

* * * * *